United States Patent
Matsubara

(10) Patent No.: US 7,595,853 B2
(45) Date of Patent: Sep. 29, 2009

(54) LIQUID CRYSTAL DISPLAY

(75) Inventor: Ryota Matsubara, Tokyo (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 217 days.

(21) Appl. No.: 11/730,308

(22) Filed: Mar. 30, 2007

(65) Prior Publication Data

US 2007/0229741 A1 Oct. 4, 2007

(30) Foreign Application Priority Data

Mar. 31, 2006 (JP) ............................. 2006-100829

(51) Int. Cl.
*G02F 1/1335* (2006.01)

(52) U.S. Cl. .................. 349/117; 349/118; 349/119

(58) Field of Classification Search .......... 349/117–119
See application file for complete search history.

(56) References Cited

U.S. PATENT DOCUMENTS

| 4,583,825 | A | 4/1986 | Buzak |
| 5,410,422 | A | 4/1995 | Bos |
| 5,583,679 | A | 12/1996 | Ito et al. |
| 5,646,703 | A | 7/1997 | Kamada et al. |
| 7,319,500 | B2 * | 1/2008 | Yoshida et al. ................. 349/96 |
| 2004/0246388 | A1 * | 12/2004 | Lee et al. ........................ 349/2 |
| 2005/0168669 | A1 * | 8/2005 | Nakamura .................... 349/96 |
| 2006/0007378 | A1 * | 1/2006 | Nakao et al. ................. 349/126 |
| 2006/0268209 | A1 * | 11/2006 | Yao et al. ..................... 349/119 |

FOREIGN PATENT DOCUMENTS

| DE | 3911620 A1 | 10/1990 |
| JP | 06-214116 A | 8/1994 |
| JP | 09-197397 A | 7/1997 |
| JP | 11-316378 A | 11/1999 |
| JP | 3056997 B2 | 6/2000 |
| JP | 2002-040429 A | 2/2002 |
| WO | WO 96/37804 A1 | 11/1996 |

* cited by examiner

*Primary Examiner*—David Nelms
*Assistant Examiner*—Thanh-Nhan P Nguyen
(74) *Attorney, Agent, or Firm*—Buchanan Ingersoll & Rooney PC

(57) ABSTRACT

The present invention adequately provides a bend alignment mode liquid crystal cell with an optical compensation to provide high contrast and excellent viewing angle characteristic, and thereby provides a liquid crystal having capability of displaying excellent images with suppressed tone reversal. Therefore, the liquid crystal display contains at least a pair of polarizing films, a liquid crystal cell placed between the pair of polarizing films and a optical compensatory film, which contains at least a first optically anisotropic layer and a second optically anisotropic layer, placed between any one of the polarizing films, and a voltage applied to the liquid crystal cell, which is a bend alignment mode cell, in white displaying state is 1V or less.

6 Claims, 5 Drawing Sheets

LIQUID CRYSTAL DISPLAY

BACKGROUND OF THE INVENTION

1. Field of the Invention

The present invention relates to a liquid crystal display, particularly to a bend alignment mode liquid crystal display.

2. Description of the Related Art

Liquid crystal displays (LCDs) are advantageous in achieving lower-profile, lighter weights, lower power consumptions, etc. as compared with cathode ray tubes (CRTs). The liquid crystal displays have a liquid crystal cell and a pair of polarizing plates placed at both sides of the cell. The liquid crystal cell contains liquid crystal molecules, two substrates for enclosing the molecules, and an electrode layer for applying voltage to the molecules.

An alignment layer is generally formed on each of the substrates to align the enclosed liquid crystal molecules.

Optical compensatory films (phase difference plates) are often formed between the liquid crystal cell and the polarizing plates to remove undesired coloration of image colors emitted by the liquid crystal cell.

A multilayered structure composed of the polarizing plates (polarizing films) and the optical compensatory films acts as a polarizing plate. The optical compensatory film can have a function of enlarging a viewing angles of the liquid crystal cell. Stretched retardation films have been used as the optical compensatory film.

Also using an optical compensatory film having an optically anisotropic layer containing a discotic compound, which can be used instead of a stretched retardation film, have been proposed in, for example, Japanese Patent Application Laid-Open (JP-A) No. 06-214116, U.S. Pat. Nos. 5,583,679 and 5,646,703, and German Patent No. 3,911,620 A1.

The optically anisotropic layer is formed by aligning the discotic compound and by fixing the alignment state. The discotic compound generally has a large birefringent index. Further, the discotic compound can be in various alignment states.

Thus, the discotic compound can be used for producing an optical compensatory film with non-conventional optical properties, which such stretched retardation films cannot have.

Liquid crystal displays using a bend alignment mode liquid crystal cell, wherein an alignment direction of rod-shaped liquid crystal molecules by the one cell substrate of the liquid crystal cells is substantially opposite, or symmetry, to that of the molecules by the other cell substrate, are proposed in, for example, U.S. Pat. Nos. 4,583,825 and 5,410,422.

In such liquid crystal displays, wherein the rod-shaped liquid crystal molecules by the one cell substrate of the cell substrates are oppositely aligned to the molecules by the other liquid crystal cell, bend alignment mode liquid crystal cells of the liquid crystal displays thus have a self optical compensatory function. Whereby, the liquid crystal mode is referred to also as an OCB (Optically Compensatory Bend) liquid crystal mode.

And the bend alignment mode liquid crystal displays are advantageous in high response speeds.

Thus, the bend alignment mode is characterized in wider viewing angles and faster response speed as compared with common liquid crystal modes such as TN and STN modes.

However, in comparison to CRTs, the bend alignment mode displays are still to be improved. It seems possible that the bend alignment mode liquid crystal displays can be further improved using an optical compensatory film as in the case of common liquid crystal mode-displays.

However, the optical compensatory films composed of the conventional stretched retardation films show insufficient optical compensatory function when they are adopted for the bend alignment mode liquid crystal displays.

Therefore, as described above, the use of the optical compensatory films having a transparent substrate and an optically anisotropic layer containing a discotic compound instead of the stretched retardation films has been proposed.

Also bend alignment mode liquid crystal displays using an optical compensatory film containing a discotic compound have been proposed in JP-A No. 09-197397, International Publication No. WO96/37804, etc.

By using the optical compensatory sheet containing a discotic compound, viewing angles of the bend alignment mode liquid crystal displays is remarkably improved.

It has been pointed out in JP-A 11-316378, etc. that, when the optical compensatory film containing a discotic compound is used in the bend alignment mode liquid crystal displays, light having a particular wavelength leaks and cause undesired coloration of images.

JP-A 11-316378 reported that the coloration is caused by wavelength dependence of transmittance of an ellipsoidal polarizing plate (a multilayered structure composed of polarizing films and optical compensatory films).

Further, it is reported that a maximum optical compensatory effect for a bend alignment mode liquid crystal cell can be achieved by arranging the optically anisotropic layer and the polarizing film such that an average angle of orthographic projections of normal lines of a discotic plane of the discotic compound to the in-plane transmission axis of the optically anisotropic layer becomes substantially 45 degrees.

Various proposals have been made on reduction of undesired coloration and prevention of tone reversal in the bend alignment mode liquid crystal displays using the optical compensatory film containing a discotic compound in Japanese Patent Application (JP-B) No. 3056997, JP-A 2002-40429, etc.

Meanwhile, the above-stated conventional bend alignment liquid crystal displays apply a relatively high-applied voltage when displaying white, thus they achieve low contrast which is the difference between white brightness and black brightness. However, bend alignment liquid crystal displays have been improved to achieve higher contrast by lowering the applied voltage when displaying white. Therefore, viewing angle compensatory films adapted for such improved bend alignment liquid crystal displays should be used to improve both contrast and viewing angles of such bend alignment liquid crystal displays.

BRIEF SUMMARY OF THE INVENTION

An object of the present invention is to provide a liquid crystal display capable of displaying an excellent image with high contrast and no tone reversal and capable of providing excellent viewing angles by providing an appropriate optical compensation for a bend alignment mode liquid crystal cell.

The means for solving aforesaid problems are as follows.

<1> A liquid crystal display including:

a pair of polarizing films, a liquid crystal cell placed between the polarizing films, an optical compensatory film placed between at least one of the polarizing films and the liquid crystal cell, wherein the optical compensatory film comprises a first optically anisotropic layer and a second optically anisotropic layer, the liquid crystal cell is a bend alignment mode cell, and
a voltage applied to the liquid crystal cell in white displaying state is 1V or less.

<2> The liquid crystal display according to item <1>, wherein an in-plane retardation value of the first optically anisotropic layer at light having a wavelength of 550 nm, or Re (550 nm), is in the range of 0 nm to 40 nm.

3. The liquid crystal display according to item <1>, wherein the first optically anisotropic layer includes a discotic compound.

4. The liquid crystal display according to item <1>, wherein the degree of a pretilt angle of the liquid crystal cell is 20° or more.

5. The liquid crystal display according to item <1>, wherein the second optically anisotropic layer is a cellulose ester film.

6. The liquid crystal display according to item <1>, wherein a voltage applied to the liquid crystal cell in black displaying state is 5V or less.

7. The liquid crystal display according to item <1>, wherein the optical compensation film, comprising a longitudinal direction and an in-plane refractive-index-reducing direction, wherein the optical compensation film satisfies the following optical property within a plane which contains the normal line of the optical compensation film and the direction of 45° inclined from the longitudinal direction toward the in-plane refractive-index-reducing direction:

$$9.0 < Re(40°)/Re(-40°) < 11.0,$$

where Re(40°) is a retardation value measured in a direction inclined 40°, toward the plane of the optical compensation film, from the normal line using light having a wavelength of 550 nm, and Re(−40°) is a retardation value measured in a direction inclined 40°, to the direction opposite to the direction of Re(40°), from the normal line using light having a wavelength of 550 nm.

In accordance with the present invention, a liquid crystal display capable of displaying an excellent image with high contrast and no tone reversal and capable of providing an excellent viewing angles can be achieved through an appropriate optical compensation for a bend alignment mode liquid crystal cell.

DETAILED DESCRIPTION OF THE INVENTION

Figure 1:
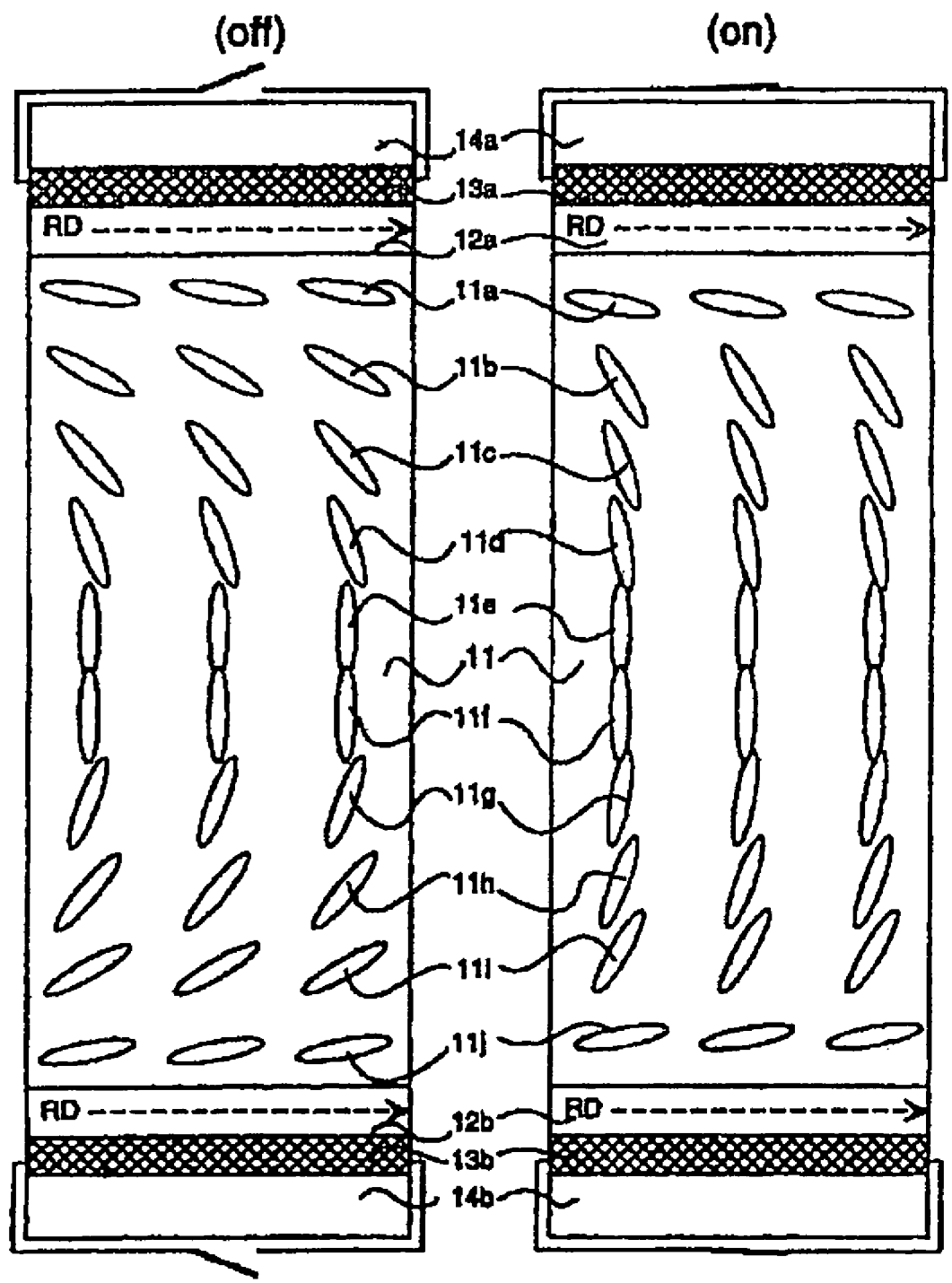
FIG. 1 is a cross-sectional view schematically showing an alignment of a liquid crystalline compound in a bend alignment mode liquid crystal cell.

Hereafter, a liquid crystal display relative to the present invention will be explained in detail.

Hereinafter, "45 degrees," "parallel" and "perpendicularity" refer to a degree or state having a variation of plus/minus 5% not inclusive. The variation is preferably in the range of plus/minus 4% not inclusive, and more preferably plus/minus 3% not inclusive. In terms of degree, the term "plus" refers to a clockwise direction, and "minus" refers to a counterclockwise direction. The term "slow axis" refers to a direction in which a maximum refractive index is obtained. The term "visible region" refers to a range of wavelengths (λ) of 380 nm to 780 nm of light. In addition, a wavelength of light for measuring refractive indexes is 550 nm in the visible light region unless otherwise stated.

Unless otherwise stated, in the explanation of the embodiments of the present invention, the term "polarizing plate" shall include a large polarizing plate and a cut polarizing plate that is cut in a size to be incorporated in a liquid crystal display. Furthermore, the term "cut" or "cutting" shall include "punching", "clipping" and the like.

In the explanation of the embodiments of the present invention, the term "polarizing film" is distinguished from the term "polarizing plate". The term "polarizing plate" shall refer to a multilayered structure having a transparent protective layer on at least one surface of a polarizing film for protecting the polarizing film.

Furthermore, in the explanation of the embodiments of the present invention, the term "molecule symmetrical axis" shall refer to a symmetrical axis of a molecule when the molecule has a rotation symmetrical axis, but the term shall not require the molecule to be rotation symmetrical in a strict sense.

Generally, a molecule symmetrical axis of a discotic liquid crystal compound is a perpendicular axis that is perpendicularly to and passes through the center of a discotic plane thereof. And a molecule symmetrical axis of a rod-shaped liquid crystal compound is generally the major axis thereof.

In the present invention, Re (λ) and Rth (λ) refers to retardations of in-plane direction and retardations of thickness direction at wavelength (λ) respectively. Re (λ) is measured through incident of light (wavelength of λnm) upon a film into a normal line direction thereof using KOBRA 21ADH or WR (all manufactured by Oji Scientific Instruments).

When the refractive index of a measured film is represented as uniaxial index ellipsoid or biaxial index ellipsoid, Rth (λ) can be calculated by the following steps.

To measure retardation values, assuming that a in-plane slow axis (determined using KOBRA 21ADH or WR) is serving as a tilt axis (or a rotation axis, and it can be any direction if any slow axis does not exist), light having wavelength of λnm that is used for measuring the Re (λ) value will be projected into the film from six directions in which directions are tilted in 10-degree steps from 0 degrees to 50 degrees toward one direction against the film normal line direction. And based on the retardation values thereby measured, an assumed value of an average refractive indexes and an entered film thickness, the Rth (λ) value will be calculated with KOBRA 21ADH or WR.

In the above case, when the film has a direction wherein a retardation value becomes zero at a tilt angle of a certain degree against the film normal line assuming the in-plane slow axis is serving as the rotation axis, retardation values at tilt angles larger than the tilt angle will be calculated and showed as negative values with KOBRA 21ADH or WR.

The Rth value can also be calculated based on retardation values measured at two tilt angles of any two degrees when a slow axis is serving as a tilt axis (or a rotation axis, and it can be any in-plane direction of the film if the slow axis does not exist), the assumed value of the average refractive indexes and an entered film thickness using the following formula (A) and (B).

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Formula (A)

Where Re ($\partial$) represents a retardation value at a tilt angle of $\partial$ degrees against the normal line direction.

And where "nx" represents a refractive index in an in-plane slow axis direction, "ny" represents a refractive index in a perpendicularly intersecting direction with "nx," and "nz" represents a refractive index in a perpendicularly intersecting directions with "nx" and "ny."

$$Rth = ((nx+ny)/2 - nz) \times d$$

Formula (B)

When the refractive index of a measured film cannot be represented as uniaxial index ellipsoid or biaxial index ellipsoid, or a film having no optic axis, a Rth ($\lambda$) value can be calculated by the following steps.

To measure retardation values, assuming that a in-plane slow axis (determined using KOBRA 21ADH or WR) is serving as a tilt axis (or a rotation axis), light having wavelength of $\lambda$nm that is used for measuring the Re ($\lambda$) value will be projected into the film from 11 directions in which directions are tilted in 10-degree steps from −50 degrees to 50 degrees against the film normal line direction. And based on the retardation values thereby measured, an assumed value of an average refractive indexes and an entered film thickness, the Rth ($\lambda$) value will be calculated with KOBRA 21ADH or WR.

The assumed value of the average refractive index can be selected from those shown in Polymer Handbooks (available from JOHN WILEY & SONS, INC.) and variety of optical film catalogs to be used for the above measurements.

An Abbe refractometer can be used for measuring unknown average refractive indexes. Average refractive indexes of major optical films are acylated cellulose (1.48); cycloolefin polymer (1.52); polycarbonate (1.59); polymethylmethacrylate (1.49) and polystyrenes (1.59). Such assumed value of an average refractive index and a film thickness need to be entered to calculate nx, ny and nz values with KOBRA 21ADH or WR. Further, based on calculated nx, ny and nz values, Nz, calculated by (nx−nz)/(nx−ny), can be calculated.

In the present invention, the term "to" includes the values before and after the term as the lower limit and upper limit respectively.

(Configurations of Liquid Crystal Display and Polarizing Plate)

The liquid crystal display of the invention is preferably a bend alignment mode liquid crystal display. The bend alignment mode liquid crystal display will be described below.

FIG. 1 is a cross-sectional view showing alignment of a liquid crystalline compound in a bend alignment mode liquid crystal cell schematically.

As shown in FIG. 1, the bend alignment mode liquid crystal cell contains an upper substrate 14a and a lower substrate 14b, and a liquid crystalline compound 11 enclosed between the substrates. The liquid crystalline compound 11 used in the bend alignment mode liquid crystal cell generally has a positive dielectric anisotropy.

In the liquid crystal cell, the upper substrate 14a and the lower substrate 14b have alignment layers 12a and 12b and electrode layers 13a and 13b, respectively.

The alignment layers have a function of aligning rod-shaped liquid crystal molecules 11a to 11j. RD represents a rubbing direction of the alignment layers. The electrode layers have a function of applying voltage to the rod-shaped liquid crystal molecules 11a to 11j.

In the present invention, the term "pretilt angle" refers to an angle between the major axes of standing-up liquid crystal molecules standing up toward polar angles at surface boundaries of a pair of alignment layers and a liquid crystal layer and an electrode substrate, where the liquid crystal molecules constitute the liquid crystal layer contained in a liquid crystal cell which is composed of the liquid crystal layer and the pair of the electrode substrates in between which the liquid crystal layer is enclosed and have alignment layers formed on each of the liquid crystal layer-side surfaces of the electrode substrates. The pretilt angle is induced through an alignment treatment conducted on the alignment layer.

A degree of the alignment treatment conducted on alignment layers, or rubbing strength (L(cm)), is defined by the following formula.

In the following formula, N represents the number of rubbing strokes, r represents the radius of a rubbing roller, n represents the number of revolutions of the roller, l represents a contact length of the rubbing roll (rubbing cloth) with an alignment layer, and v represents a stage moving speed.

In the embodiments of the present invention, the number of rubbing strokes (N), the radius of a rubbing roller (r), the number of revolutions of the rubbing roller (n), and a stage moving speed (v) were maintained at a constant value, and rubbing treatments were conducted with varying contact lengths (l) of the rubbing roll (rubbing cloth) with alignment layers so that the rubbing strengths depended on the contact lengths (l) of the rubbing roll (rubbing cloth) with the alignment layers.

Formula $$L = N \times l(1 + 2.pi.rn/60\ v)$$

As shown in (off) of FIG. 1, when a low voltage is applied to the bend alignment mode liquid crystal cell, the rod-shaped liquid crystal molecules 11a to 11e near the upper substrate 14a and the molecules 11f to 11j near the lower substrate 14b will be aligned in opposite directions (symmetrically) in the cell.

The rod-shaped liquid crystal molecules 11a, 11b, 11i, and 11j positioned nearer the substrates 14a and 14b will be aligned approximately horizontally, and the rod-shaped liquid crystal molecules 11d to 11g around the center of the liquid crystal cell will be aligned approximately perpendicularly.

As shown in (on) of FIG. 1, when a high voltage is applied to the liquid crystal cell, the rod-shaped liquid crystal molecules 11a and 11j near the substrates 14a and 14b will still be aligned approximately horizontally, and the rod-shaped molecules 11e and 11f around the center of the liquid crystal cell will still be aligned approximately perpendicularly.

A voltage increase changes the alignment of the rod-shaped liquid crystal molecules 11b, 11c, 11d, 11g, 11h, and 11i positioned between the substrates and the center of the liquid crystal cell, and these molecules are more perpendicularly aligned in the on state than in the off state.

As in the case of the off state, the rod-shaped liquid crystal molecules 11a to 11e near the upper substrate 14a and the molecules 11f to 11j near the lower substrate 14b are aligned in opposite directions (symmetrically) in the cell in the off state.

Figure 2:
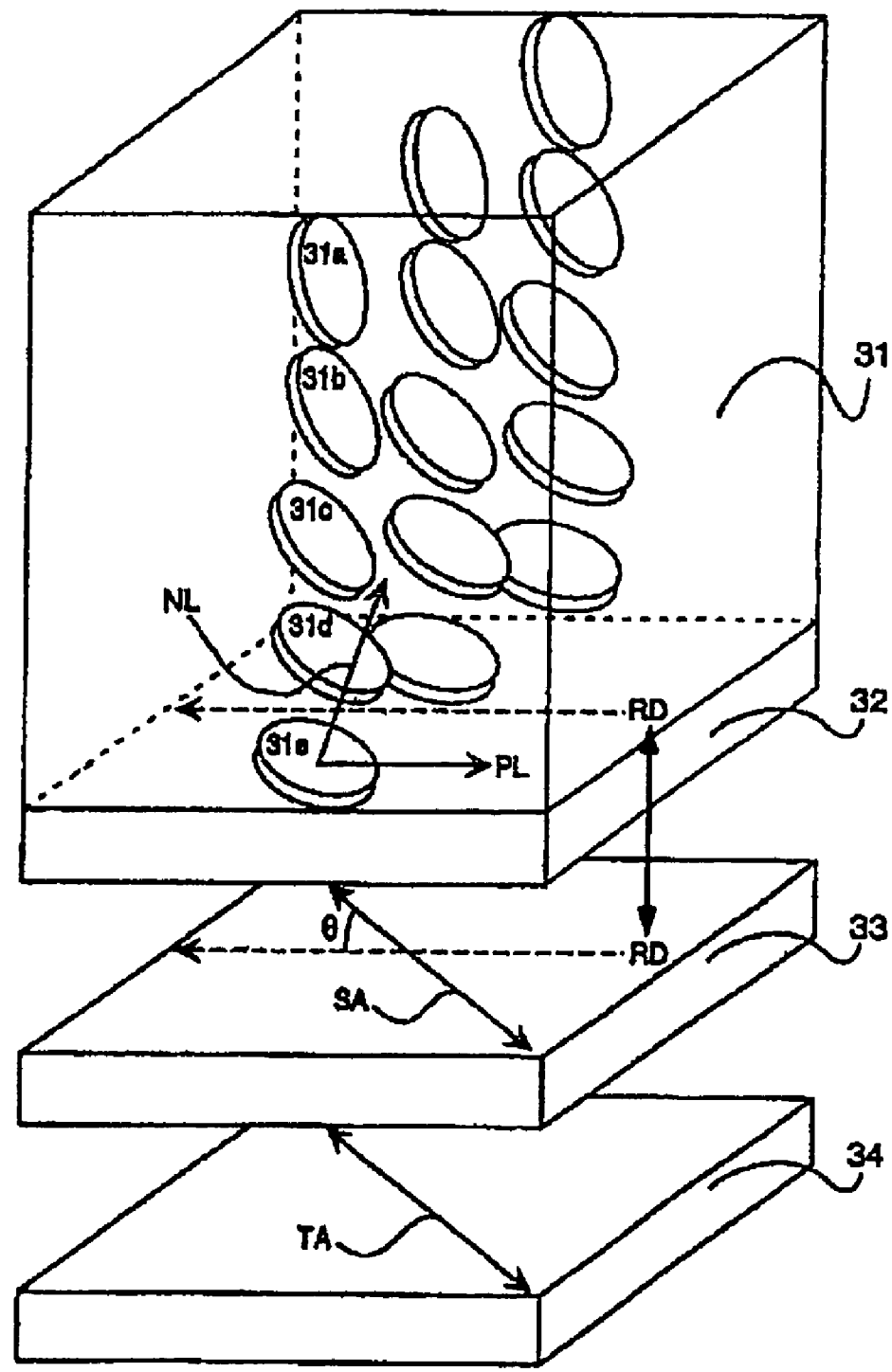
FIG. 2 is a perspective diagram schematically showing a polarizing plate.

FIG. 2 is a schematic view showing a polarizing plate.

As shown in FIG. 2, the polarizing plate of the present invention is a multilayered structure composed of a first optically anisotropic layer 31 containing discotic compound molecules 31a to 31e, a second optically anisotropic layer 33 containing at least one cellulose acylate film, and a polarizing film 34.

The polarizing plate of FIG. 2 has an alignment layer 32 between the first optically anisotropic layer 31 and the second optically anisotropic layer 33.

The discotic compound molecules 31a to 31e in the first optically anisotropic layer 31 are planar molecules.

Each of the discotic compound molecules 31a to 31e has only one discotic plane. The discotic planes are tilted against a surface of the second optically anisotropic layer 33.

Angles of the discotic planes against the surface of the second optically anisotropic layer (tilt angles) increase with distance increase of the discotic compound molecules from the alignment layer. The average tilt angle should preferably be within a range of 15 degrees to 50 degrees.

As shown in FIG. 2, by varying the tilt angles, a viewing angle enlarging function to provide wider viewing angles for the polarizing plate can remarkably be improved.

Further, the polarizing plate with varied tilt angles has also a function of preventing undesired image inversion, tone variation, or coloration. A direction PL is obtained by orthogonally projecting the normal line NL of the discotic plane of each discotic compound molecules 31a to 31e on the second optically anisotropic layer 33, and an average direction of the directions PL is antiparallel to the rubbing direction RD of the alignment layer 32.

In the present invention, it is preferred that an angle of the average direction of the directions PL, obtained by orthogonally projecting the normal line NL of each discotic plane of the discotic compound on the second optically anisotropic layer, against the in-plane slow axis SA of the second optically anisotropic layer 33 be substantially 45 degrees. Thus, it is preferred that an angle (θ) between the rubbing direction RD of the alignment layer 32 and the in-plane slow axis SA of the second optically anisotropic layer be controlled at substantially 45 degrees during a production process for the polarizing plate.

Further, in the present invention, the second optically anisotropic layer and the polarizing films are preferably disposed such that the in-plane retardation axis SA of the second optically anisotropic layer is substantially parallel or perpendicular to the in-plane transmission axis TA of the polarizing film 34.

As shown in FIG. 2, in the polarizing plate, a second optically anisotropic layer is parallel placed. The in-plane retardation axis SA of the second optically anisotropic layer 33 corresponds to the stretching direction of the second optically anisotropic layer in principle. The in-plane transmission axis TA of the polarizing film 34 corresponds to a direction perpendicular to the stretching direction of the polarizing film in principle.

Figure 3:
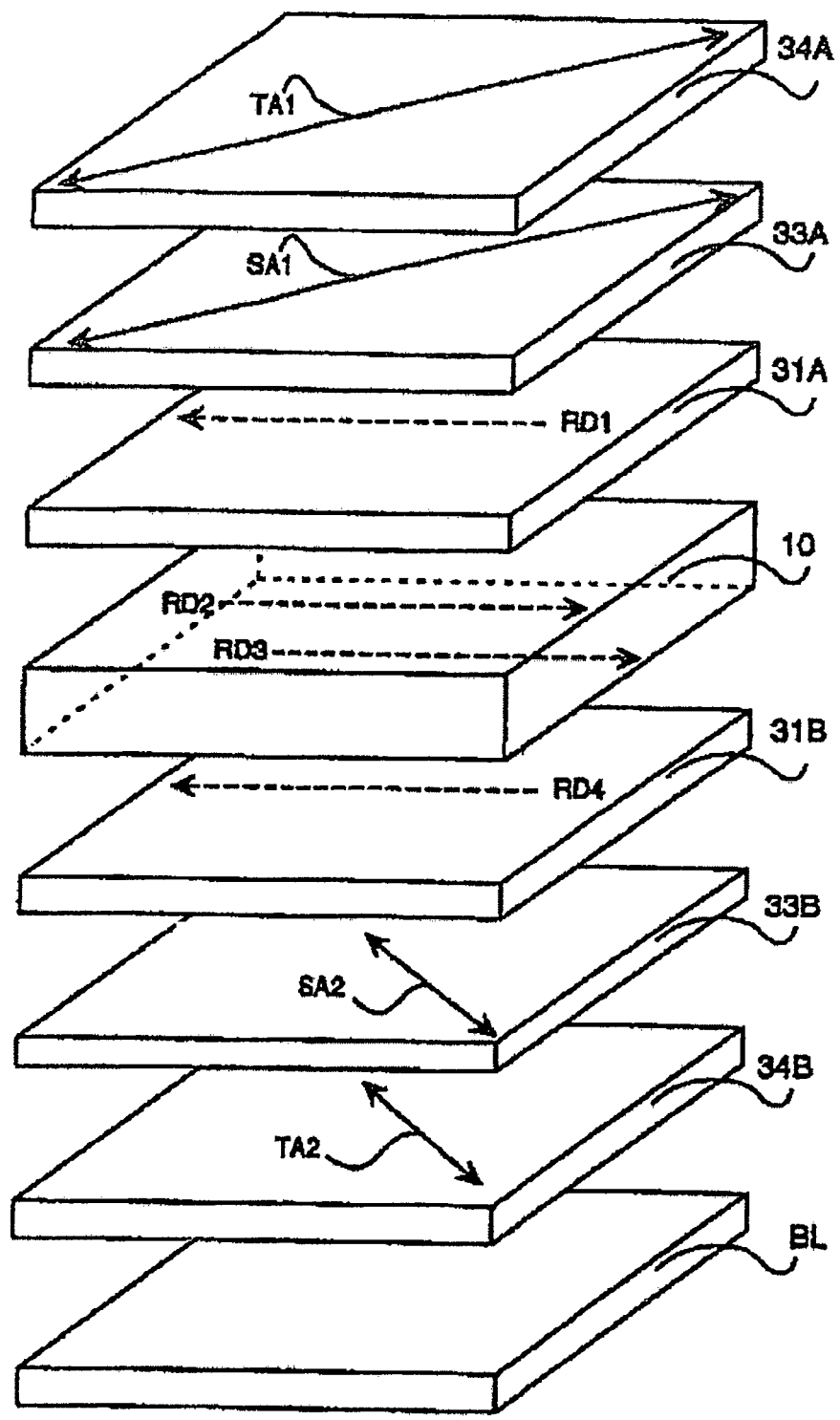
FIG. 3 is a perspective diagram schematically showing a bend alignment mode liquid crystal display of the present invention.

FIG. 3 is a perspective diagram schematically showing a preferred bend alignment mode liquid crystal display according to the present invention.

As shown in FIG. 3, the liquid crystal display of the present invention has a bend alignment mode liquid crystal cell 10, a pair of polarizing plates placed on the both sides of the liquid crystal cell, and a backlight BL.

The bend alignment mode liquid crystal cell 10 corresponds to the liquid crystal cell shown in FIG. 1.

Rubbing directions RD2 and RD3 of the upper and lower surfaces of the liquid crystal cell 10 are in equal (parallel) directions.

The polarizing plates are multilayered structures composed of first optically anisotropic layers 31A and 31B, second optically anisotropic layers 33A and 33B, and polarizing films 34A and 34B in this order of direction from the liquid crystal cell 10 to polarizing films 34A and 34B.

Rubbing directions RD1 and RD4 of a discotic compound of the first optically anisotropic layers 31A and 31B are antiparallel to the rubbing directions RD2 and RD3 that are facing to the rubbing directions RD1 and RD4 respectively of the liquid crystal cell 10.

As described above, the rubbing directions RD1 and RD4 of the discotic compound are antiparallel to the average of the directions obtained by orthogonally projecting the normal line of each discotic plane onto the each second optically anisotropic layer.

The in-plane slow axes SA1 and SA2 of the second optically anisotropic layers 33A and 33B, and the in-plane transmission axes TA1 and TA2 of the polarizing films 34A and 34B are substantially at an angle of 45 degrees to the rubbing directions RD1 and RD4 of the discotic compound in the same plane.

And the two polarizing films 34A and 34B are placed such that the in-plane transmission axes TA1 and TA2 are perpendicular to each other (in the crossed nicols state).

<Polarizing Plate>

The second optically anisotropic layers and the first optically anisotropic layers are attached to polarizing films, and they are configured to function as polarizing plates.

<<Polarizing Film>>

The polarizing films include alignment type polarizing films and coating type polarizing films such as those available from Optiva Inc.

The alignment type polarizing films preferably contain an iodine or a dichroic dye in combination with a binder.

The iodine or dichroic dye is aligned to induce polarizing properties in the binder.

It is preferred that the iodine or dichroic dye be aligned along the binder molecules, or the dichroic dye be self-assembled as liquid crystalline compounds and aligned in one direction.

Commercially available alignment type polarizing films are generally produced by soaking a stretched polymer in a solution of iodine bath or dichroic dye bath, thereby penetrating the iodine or dichroic dye into the binder.

Further, the commercially available polarizing films have distributed iodine or dichroic dye in a region of thickness of approximately 4 μm (total 8 μm on both sides) formed on a surface thereof, and it is preferred that the thickness be 10 μm or more from the viewpoint of achieving a sufficient polarizing performance.

The degree of the penetration can be controlled by selecting the concentration of the solution of the iodine or dichroic dye, the bath temperature, and the soaking time.

The thickness of the polarizing film is preferably equal to or less than those of commercially available polarizing plates (30 μm), more preferably 25 μm or less, further preferably 20 μm or less. When the thickness is 20 μm or less, light leakage will not occur in a 17-inch liquid crystal display.

The binder of the polarizing film may be crosslinked. Or a bridgeable polymer can be used as the binder of the polarizing film. A polarizing film can be formed by giving light, heat, or pH variation to functionalized polymers or polymers obtained by introducing functional groups thereto to thereby induce a cross-linking reaction between the polymers.

A crosslinking agent may be used to introduce a crosslinked structure to the polymers. The crosslinking agent that is a compound having high reactivity will be used to introduce a linking group derived from the linking agent to between binders for inducing a cross-linking reaction between the binders to thereby form the polarizing film.

A cross-linking is generally processed by applying a coating liquid containing a bridgeable polymer or a mixture of a polymer and a crosslinking agent to a transparent substrate, and then heating the applied liquid.

The cross-linking may be processed at any time during the production of the polarizing plate because durability is required only for the complete products.

The binder of the polarizing film may be the polymer capable of being crosslinked per se or being crosslinked by the crosslinking agent.

Examples of the polymers include polymethyl methacrylates, polyacrylic acids, polymethacrylic acids, polystyrenes, polyvinyl alcohols, modified polyvinyl alcohols, poly(N-methylolacrylamide)s, polyvinyltoluenes, chlorosulfonated polyethylenes, nitrocelluloses, chlorinated polyolefins such as polyvinylchlorides, polyesters, polyimides, polyvinyl acetates, polyethylenes, carboxymethylcelluloses, polypropylenes, polycarbonates, and copolymers thereof such as acrylic acid/methacrylic acid copolymers, styrene/maleinimide copolymers, styrene/vinyltoluene copolymers, vinyl acetate/vinyl chloride copolymers, and ethylene/vinyl acetate copolymers.

A silane coupling agent may be used as the polymer. Preferred as the polymer are water-soluble polymers such as poly(N-methylolacrylamide)s, carboxymethylcelluloses, gelatins, polyvinyl alcohols, and modified polyvinyl alcohols, more preferred are gelatins, polyvinyl alcohols, and modified polyvinyl alcohols, and the most preferred are polyvinyl alcohols and modified polyvinyl alcohols.

The saponification degree of the polyvinyl alcohol or modified polyvinyl alcohol is preferably in the range of 70% to 100%, more preferably 80% to 100%, further preferably 95 to 100%. The polymerization degree of the polyvinyl alcohol is preferably in the range of 100 to 5,000.

A modification group may be introduced to the polyvinyl alcohol by copolymerization modification, chain transfer modification, or block polymerization modification to obtain the modified polyvinyl alcohol.

Examples of the modification groups introduced by copolymerization include —COONa, —Si(OX)$_3$ (in which X is a hydrogen atom or an alkyl group), —N(CH$_3$)$_3$.about.Cl, —C$_9$H$_{19}$, —COO, —SO$_3$Na, and —Cl$_{12}$H$_{25}$.

Examples of the modification groups introduced by chain transfer include —COONa, —SH, and —SC$_{12}$H$_{25}$.

The polymerization degree of the modified polyvinyl alcohol is preferably in the range of 100 to 3,000.

The modified polyvinyl alcohols are described in JP-A No. 08-338913, JP-A No. 09-152509, and JP-A No. 09-316127.

An unmodified polyvinyl alcohol and an alkylthio-modified polyvinyl alcohol with a saponification degree of 85 to 95% are particularly preferable.

Two or more of the polyvinyl alcohols and modified polyvinyl alcohols may be used in combination.

A crosslinking agent is described in U.S. Reissue Pat. No. 23297. Also a boron compound such as a boric acid or borax may be used as the crosslinking agent.

A higher proportion of the cross-linking agent contained in the binder can improve the resistance of the polarizing film against moisture and heat.

However, the reduction of the alignment property of the iodine or dichroic dye can be more effectively prevented by controlling the content proportion of the cross-linking agent to the binder at 50% by mass or less. The proportion of the cross-linking agent to the binder is preferably in the range of 0.1% by mass to 20% by mass, more preferably 0.5% by mass to 15% by mass.

After the completion of a cross-linking reaction, the binder may contain a certain amount of unreacted cross-linking agent. The mass ratio of the residual cross-linking agent to the binder is preferably 1.0% by mass or less, more preferably 0.5% by mass or less. The mass ratio of 1.0% by mass or less results in a higher durability. In other words, it can more effectively prevent occurrence of a case in which a polarizing film with a large amount of the residual cross-linking agent is incorporated in a liquid crystal display, and thus can provide higher durability while preventing degradation of the polarization properties of the polarizing film even used over a long period of time or left under a high-temperature/high-humidity environment.

The dichroic dyes include azo dyes, stilbene dyes, pyrazolone dyes, triphenylmethane dyes, quinoline dyes, oxazine dyes, thiazine dyes, and anthraquinone dyes. The dichroic dye is preferably water soluble.

The dichroic dye preferably has a hydrophilic substituent such as a sulfo, amino, or hydroxyl group.

Examples of the dichroic dyes include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, and C.I. Acid Red 37.

The dichroic dyes are described in JP-A No. 01-161202, JP-A No. 01-172906, JP-A No. 01-172907, JP-A No. 01-183602, JP-A No. 01-248105, JP-A No. 01-265205, and JP-A No. 07-261024, and they can be used in the present invention.

The dichroic dye is used in the form of a free acid or a salt such as an alkali metal salt, an ammonium salt, or an amine salt.

By combining two or more dichroic dyes, the polarizing film can have various hues.

When a compound (a dye) that shows black color with polarizing axes intersected perpendicularly or various dichroic molecules combined for showing black color is used in the polarizing film, the resulting film is excellent in single-plate transmittance and polarizing properties.

The polarizing film is colorized by the iodine or dichroic dye after the binder is stretched to the longitudinal direction (MD direction) of the polarizing film (in a stretching method) or is rubbed (in a rubbing method).

In the stretching method, the stretch ratio is preferably in the range of 2.5 times to 30.0 times, more preferably 3.0 times to 10.0 times.

The stretching is preferably carried out by dry stretching in the air. Further, the binder may be soaked in water and stretched by wet stretching.

The stretch ratio in the dry stretching is preferably in the range of 2.5 times to 5.0 times, and the stretch ratio in the wet stretching is preferably in the range of 3.0 times to 10.0 times.

The stretching may be carried out several times, so that the binder is stretched more uniformly even when the stretch ratio thereof is high.

Before stretching, the binder may be slightly pre-stretched transversely or longitudinally to prevent shrinkage in the width direction.

From the viewpoint of yield, it is preferred that the binder be stretched at a tilt angle of 10 degrees to 80 degrees against the longitudinal direction. In this case, stretching can be carried out through conducting a tenter stretching at a biaxial stretching in a left-right asymmetry manner.

The biaxial stretching are the same as those used in common film forming.

In the biaxial stretching, the binder film is stretched leftward and rightward at different speeds, whereby the left part and the right part of the film need to have different thicknesses before being stretched.

In the case of using a casting method, flow rates of a binder solution to the left and right can be differentiated by tapering the die.

The stretching is preferably carried out such that the film-stretching tilt angle is equal to the angle of the transmission axis of 2 polarizing plates bonded on the both sides of the liquid crystal cell against the transverse or longitudinal direction of the liquid crystal cell. Generally, the tilt angle is 45 degrees.

However, it is preferred that the stretching direction can be freely controlled depending on the liquid crystal display because transmission-, reflection-, or semi-transmission-type liquid crystal displays not having the tilt angle of 45 degrees have been developed recently.

As described above, the binder film is oblique-stretched at the tilt angle of 10 degrees to 80 degrees against the MD direction of the polarizing film.

In a rubbing method, common rubbing treatments for aligning liquid crystals of liquid crystal displays may be used. Thus, the surface of the film may be rubbed with paper, gauze, felt, rubber, nylon, polyester fiber, etc. in a constant direction to obtain an alignment.

The rubbing treatment is generally carried out such that a film is rubbed several times with a cloth woven from fibers which are with uniform length and width.

In the rubbing, a rubbing roll having 30 µm or less of circularity, cylindricity, and deflection (eccentricity) is preferably used.

A lap angle of the film to the rubbing roll is preferably 0.1 degrees to 90 degrees. The film may be wound around the roll at 360 degrees or more to achieve a stable rubbing treatment as described in JP-A No. 06-160430.

In the case of rubbing a long film, the film is preferably transported at a rate of 1 m/min to 100 m/min under a constant tensile force applied thereto using a transport unit.

The rubbing roll is preferably rotatable in the horizontal direction against the film transport direction in order to control the rubbing angle. It is preferred that the rubbing angle is appropriately selected within the range of 0 degrees to 60 degrees. In the case of using the film in liquid crystal displays, the rubbing angle is preferably 40 degrees to 50 degrees, particularly preferably 45 degrees.

It is preferred that a protective film is formed on both sides of a polarizing film, and a type of a roll optical compensatory film is preferably used as a protective film for the one side.

A preferred multilayered structure is composed of the protective film/the polarizing film/a second optically anisotropic layer/a first optically anisotropic layer, or a structure composed of the protective film/the polarizing film/the second optically anisotropic layer/the alignment layer/the first optically anisotropic layer, formed in the listed order.

The polarizing film may be bonded onto the first optically anisotropic layer. An adhesive may be used for bonding them. Examples of a preferred adhesive is aqueous boron compound solutions and polyvinly alcohol resins, which may be modified by an acetoacetyl group, a sulfonic acid group, a carboxyl group, or an oxyalkylene group, and more preferred adhesives are the polyvinyl alcohol resins.

The dry thickness of the adhesive layer is preferably within the range of 0.01 µm to 10 µm, more preferably within the range of 0.05 µm to 5 µm.

A light diffusion film or an antidazzle film may be bonded onto the polarizing plate surface.

Figure 4:
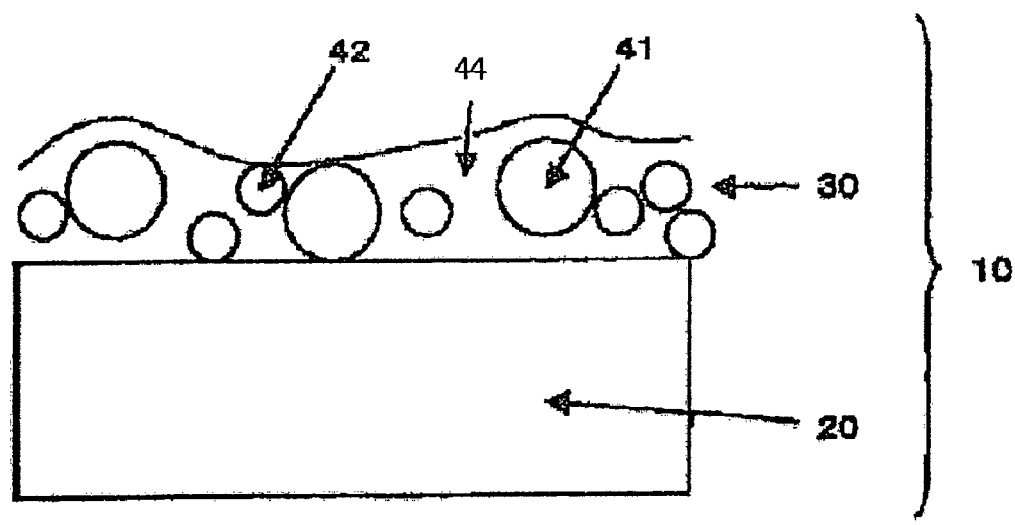
FIG. 4 is a schematic cross-sectional view showing a typical embodiment of a light diffusion film.

FIG. 4 is a schematic cross-sectional view showing a typical light diffusion film.

The light diffusion film 10 shown in FIG. 4 has a transparent substrate film 20 and a light diffusion layer 30 formed thereon. The light diffusion layer contains first light transmittable particles 41 and second light transmittable particles 42 in a light transmittable resin 44.

Explanation will be hereinafter made on two types of the light transmittable particles having different refractive indexes and different particle size distribution peaks, though, the same types of light transmittable particles having the same refractive index and different particle size distribution peaks or one type of light transmittable particles may be used.

The first light transmittable particles 41 can be composed of a light transmittable resin, for example, silica particles having an average particle size of 1.0 µm and a refractive index of 1.51, and the second light transmittable particles 42 can be composed of, for example, styrene beads having an average particle size of 3.5 µm and a refractive index of 1.61.

The light diffusion film shows the light diffusion function due to the difference of refractive indexes between the light transmittable resin 44 and the light diffusion particles 41 and 42.

The difference of the refractive indexes is preferably 0.02 to 0.15. When the difference of the refractive indexes is 0.02 or more, the light diffusion film can have more excellent light diffusion effect. When the difference is 0.15 or less, the film can be effectively prevented from being entirely white.

The difference of the refractive indexes is more preferably in the range of 0.03 to 0.13, further preferably 0.04 to 0.10.

In the case of using the polarizing film in the liquid crystal display, it is preferred that an antireflection layer is formed on the viewer's side surface of the polarizing film. The antireflection layer may function also as a protective layer on the viewer's side of the polarizing film. It is preferred that the antireflection layer have internal haze of 50% or more from the viewpoint of reducing the color variation dependency on viewing angles.

The antireflection layer is described in JP-A No. 2001-33783, JP-A No. 2001-343646, and JP-A No. 2002-328228.

<The First Optically Anisotropic Layer>

The first optically anisotropic layer preferably contains a liquid crystalline compound or a discotic compound, and more preferably contains a liquid crystalline discotic compound.

The Re value of the first optically anisotropic layer, which is measured from the normal line direction of the film, is preferably in the range of 0 nm to 40 nm, more preferably 20 nm to 40 nm, further preferably 25 nm to 40 nm.

The first optically anisotropic layer is preferably designed for compensating the liquid crystal compound in a black displaying state of the liquid crystal cell of the liquid crystal display.

The alignment state of the liquid crystal compound in the liquid crystal cell is described in IDW'00, FMC7-2, page 411 to 414.

Both a high-/low-molecular liquid crystalline compound having a discotic molecular structure can preferably used for the discotic compound. The discotic compound may be such that the liquid crystalline compound is polymerized or crosslinked and loses the liquid crystallinity.

<<Discotic Compound>>

The discotic compounds include benzene derivatives described in C. Destrade, et al., Mol. Cryst., Vol. 71, Page 111 (1981), truxene derivatives described in C. Destrade, et al., Mol. Cryst. Vol. 122, Page 141 (1985) and Physics Lett., A, Vol. 78, Page 82 (1990), cyclohexane derivatives described in B. Kohne, et al., Angew. Chem., Vol. 96, Page 70 (1984), and azacrown- or phenylacetylene-based macrocycles described in J. M. Lehn, et al., J. Chem. Commun., Page 1794 (1985) and J. Zhang, et al., J. Am. Chem. Soc., Vol. 116, Page 2655 (1994).

The discotic compound generally has a structure containing a core at the center of the molecule on which straight alkyl, alkoxy, or substituted benzoyloxy groups are radially substituted as side chains of the core.

It is preferred that the discotic compound have rotation symmetry in the form of a molecule or a molecular assembly and can be in an alignment.

The first optically anisotropic layer is formed from the discotic compound, and the compound does not need to have liquid crystallinity in the layer.

For example, the discotic compound may be a low-molecular liquid crystalline discotic compound having a heat- or light-responsive group, and the compound may be polymerized or crosslinked by heat or light reaction to lose the liquid crystallinity.

The discotic compound is described in JP-A No. 08-50206. Polymerization of the discotic compound is described in JP-A NO. 08-27284.

A polymerizable group may be connected to the discotic core of the discotic compound as a substituent to fix the discotic compound by polymerization.

The discotic core and the polymerizable group can be connected by a linking group, whereby the alignment is maintained after the polymerization.

Such discotic compounds having a polymerizable group are described in JP-A NO. 2000-155216, paragraph 0151 to 0168.

In hybrid alignment of the discotic compound, the angles of the major axes (the discotic planes) of the discotic compound molecules against the polarizing film surface are increased or decreased as the distances from the polarizing film are increased in the depth direction of the optically anisotropic layer. The angles are preferably decreased along with the distance increase. Further, variation of the angles may be continuous increase, continuous decrease, intermittent increase, intermittent decrease, combination of continuous increase and continuous decrease, or combination of intermittent increase and decrease. In the case of the intermittent variation, there is an area with constant tilt angles in the middle of the layer. The layer may contain such an area with constant average angles as long as the angles are increased or decreased as a whole. It is preferred that the angles vary continuously.

The average direction of the major axes of the discotic compound on the side of the polarizing film can be controlled by selecting the discotic compound, a material for the alignment layer, or a rubbing treatment method.

The direction of the major axes (the discotic planes) of the discotic compound on the front side (rear the air interface) can be controlled by selecting an additive used in combination with the discotic compound.

Examples of the additives for use in combination with the discotic compound include plasticizers, surfactants, polymerizable monomers, and polymerizable polymers. The degree of alignment direction variation of the major axes can be controlled by selecting the discotic compound and the additive. The uniformity and strength of the layer, and the alignment of the discotic compound can be improved by the plasticizer, surfactant, or polymerizable monomer. It is preferred that the additive has compatibility to the discotic compound, can change the tilt angle of the discotic compound, and does not inhibit the alignment of the compound.

<Polymerizable Monomers>

The polymerizable monomer contains a polymerizable compound and a cation-polymerizable compound, and is preferably a polyfunctional radical-polymerizable monomer. It is preferred that the monomer have a polymerizable group copolymerizable with a polymerizable group of the discotic compound. The polymerizable monomer is described n JP-A No. 2002-296423, Paragraph 0018 to 0020.

The mass ratio of the polymerizable monomer to the discotic compound is preferably in the range of 1% to 50% by mass, more preferably 5% to 30% by mass.

<Surfactant>

The surfactant is preferably a fluorine compound. The surfactant is described in JP-A NO. 2001-330725.

The polymer preferably generates variation in the tilt angles of the discotic compound.

The polymer is preferably a cellulose ester. The cellulose ester is described in JP-A No. 2000-155216, Paragraph 0178.

The mass ratio of the polymer to the discotic compound is preferably in the range of 0.1% to 10% by mass, more preferably 0.1% to 8% by mass, from the viewpoint of not inhibiting the alignment of the discotic compound.

The phase transition temperature of the discotic compound between the discotic nematic liquid crystalline phase and the solid phase is preferably in the range of 70° C. to 300° C., more preferably 70° C. to 170° C.

The first optically anisotropic layer can be formed by applying a coating liquid containing the discotic compound to the alignment layer, and the coating liquid may contain a polymerization initiator described later or another component if necessary.

Organic solvents are preferably used as a solvent for the coating liquid. Examples of the organic solvents include amides such as N,N-dimethylformamide; sulfoxides such as dimethylsulfoxide; heterocyclic compounds such as pyridine; hydrocarbons such as benzene and hexane; alkyl nalides such as chloroform, dichloromethane, and tetrachloroethane; esters such as methyl acetate and butyl acetate; ketones such as acetone and methyl ethyl ketone; and ethers such as tetrahydrofuran and 1,2-dimethoxyethane. Preferred organic solvents include alkyl halides and ketones. Two or more organic solvents may be used in combination.

The coating liquid may be applied by a known method such as a spin coating method, a wire-bar coating method, an extrusion coating method, a direct gravure coating method, a reverse gravure coating method, or a die coating method.

The thickness of the first optically anisotropic layer is preferably 0.1 μm to 20 μm, more preferably 0.5 μm to 15 μm, further preferably 1 μm to 10.mu.m.

The aligned discotic compound molecules may be fixed in the alignment state.

The fixation is preferably achieved by polymerization.

The polymerization may be heat polymerization using a heat polymerization initiator or photopolymerization using a photopolymerization initiator, and is preferably photopolymerization.

Examples of the photopolymerization initiators include.alpha.-carbonyl compounds described in U.S. Pat. Nos. 2,367,661 and 2,367,670; acyloin ethers described in U.S. Pat. No. 2,448,828; alpha.-hydrocarbon-substituted, aromatic acyloin compounds described in U.S. Pat. No. 2,722,512; polynuclear quinone compounds described in U.S. Pat. Nos. 3,046,127 and 2,951,758; combinations of triarylimidazole dimers and p-aminophenyl ketone described in U.S. Pat. No. 3,549,367; acridine compounds and phenazine compounds described in JP-A No. 60-105667 and U.S. Pat. No. 4,239,850; and oxadiazole compounds described in U.S. Pat. No. 4,212,970.

The mass ratio of the photopolymerization initiator to the solid content of the coating liquid is preferably 0.01% by mass to 20% by mass, more preferably 0.5% by mass to 5% by mass.

In the photopolymerization, the liquid crystal molecules are preferably irradiated with ultraviolet ray.

The irradiation energy is preferably 20 J/cm$^2$ to 50 J/cm$^2$, more preferably 20 mJ/cm$^2$ to 5,000 mJ/cm$^2$, further preferably 100 mJ/cm$^2$ to 800 mJ/cm$^2$. The irradiation may be carried out under a heating condition to accelerate the photopolymerization reaction.

Furthermore, a protective layer may be formed on the first optically anisotropic layer.

<Alignment Layer>

The alignment layer may act to determine, for example, the alignment direction of the liquid crystal molecules in the first optically anisotropic layer.

When the liquid crystalline compound is aligned and fixed to the alignment state, the alignment layer completes its role. Thus the alignment layer is not necessarily an essential component of the liquid crystal display after production.

For example, a liquid crystal display having no alignment layers between the first and second optically anisotropic layers can be produced by transferring the first optically anisotropic layer in the fixed alignment state to the first optically anisotropic layer.

However, the alignment layer is generally formed between the first and second optically anisotropic layers.

The alignment layer may be formed by a method of rubbing an organic compound (preferably a polymer), a method of oblique-depositing an inorganic compound, a method of forming a layer with microgrooves, or a method of accumulating an organic compound (e.g., ω-tricosanic acid, dioctadecylmethylammonium chloride, methyl stearate) using Langmuir-Blodgett process to form an LB film.

Further, the alignment layer may be a known alignment layer having an electric field activated-, a magnetic field activated- or a light irradiation activated-aligning function.

The alignment function of the alignment layer is preferably formed by having it undergo the rubbing treatment. The rubbing treatment may be a known one for aligning liquid crystals of liquid crystal displays.

Thus, the surface of the alignment layer may be rubbed with paper, gauze, felt, rubber, nylon, polyester fiber, etc. in a constant direction to obtain the alignment.

The layer is generally rubbed several times with a cloth woven from fibers with uniform length and width.

The polymer for the alignment layer essentially has a molecular structure with a function of aligning the liquid crystal molecules.

It is preferred that polymer for the alignment layer have a function of fixing the alignment of the liquid crystal molecules in addition to the function of aligning the liquid crystal molecules. For example, it is preferred that a side chain having a crosslinking functional group such as a double bond group be connected to the main chain of the polymer, or a crosslinking functional group having a function of aligning the liquid crystal molecules be introduced to the side chain of the polymer.

It is preferred that the polymer for the alignment layer itself be bridgeable or can be crosslinked using a crosslinking agent.

The bridgeable polymer is described in JP-A No. 08-338913, Paragraph 0022.

Examples of the bridgeable polymers include polymethacrylates, polystyrenes, polyolefins, polyvinyl alcohols, modified polyvinyl alcohols, poly(N-methylolacrylamide)s, polyesters, polyimides, polyvinyl acetates, carboxymethylcellulose, polycarbonates, and copolymers thereof.

A silane coupling agent may be used as the polymer. Preferred as the polymer are water-soluble polymers such as poly(N-methylolacrylamide)s, carboxymethylcelluloses, gelatins, polyvinyl alcohols, and modified polyvinyl alcohols, more preferred are gelatins, polyvinyl alcohols, and modified polyvinyl alcohols, and the most preferred are polyvinyl alcohols and modified polyvinyl alcohols. Two or more of these polymers may be used in combination.

The saponification degree of the polyvinyl alcohol is preferably in the range of 70% to 100%, more preferably 8% to 100%. The polymerization degree of the polyvinyl alcohol is preferably in the range of 100 to 5,000.

The side chain having the function of aligning the liquid crystal molecules generally contains a hydrophobic group as a functional group. Specifically the type of the functional group is selected based on the type of the liquid crystal molecules and the desired alignment state.

The modified polyvinyl alcohol has a modification group, which may be introduced by copolymerization modification, chain transfer Modification, or block polymerization modification.

Examples of the modification groups include hydrophilic groups such as carboxylic acid groups, sulfonic acid groups, phosphonic acid groups, amino groups, ammonio groups, amido groups, and thiol groups; hydrocarbon groups having 10 to 100 carbon atoms; fluorine-substituted hydrocarbon groups; alkylthio groups; polymerizable groups such as unsaturated polymerizable groups, epoxy groups, and aziridinyl groups; and alkoxysilyl groups such as trialkoxy-silyl, dialkoxy-silyl, or monoalkoxy-silyl groups.

The modified polyvinyl alcohol is described in JP-A No. 2000-155216 and JP-A No. 2002-62426.

By connecting a side chain having a cross-linking functional group to the main chain of the polymer of the alignment layer or by introducing a cross-linking functional group to the side chain having the function of aligning the liquid crystal molecules, the polymer of the alignment layer can be copolymerized with the polyfunctional monomer of the first optically anisotropic layer.

As a result, strong covalent bonds are formed not only between the polyfunctional monomers, but also between the polymers of the alignment layer and between the polyfunctional monomer and the polymer of the alignment layer.

Thus, the strength of the optical compensatory film can be remarkably improved by introducing the crosslinking functional group to the polymer of the alignment Layer.

The cross-linking functional group of the alignment layer polymer is preferably a polymerizable group as the polyfunctional monomer. The cross-linking functional group is described in JP-A No. 2000-155216, Paragraph 0080 to 0100.

The alignment layer polymer may be crosslinked by a cross-linking agent regardless of using the cross-linking functional group.

Examples of the cross-linking agents include aldehydes, N-methylol compounds, dioxane derivatives, compounds capable of activating a carboxyl group, active vinyl compounds, active halogen compounds, isoxazoles, and dialdehyde starches. Two or more types of the cross-linking agents may be used in combination.

The cross-linking agent is described in JP-A No. 2002-62426. The cross-linking agent is preferably a high-reactive aldehyde, particularly glutaraldehyde.

The ratio of the cross-linking agent to the polymer is preferably 0.1% by mass to 20% by mass, more preferably 0.5% by mass to 15% by mass.

The content of the unreacted crosslinking agent remaining in the alignment layer is preferably 1.0% by mass or less, more preferably 0.5% by mass or less. By reducing the content of the residual crosslinking agent, a sufficient durability can be obtained without reticulation even in a case where the liquid crystal display is used or left under a high-temperature high-humidity environment over a long period of time.

The alignment function of the alignment layer may be formed by the steps of applying a coating liquid containing the above polymer and the crosslinking agent to the second optically anisotropic layer, heat-drying (crosslinking) the applied liquid, and subjecting it to a rubbing treatment.

The crosslinking reaction is preferably carried out after applying the liquid to the second optically anisotropic layer. In the case of using the water-soluble polymer such as the polyvinyl alcohol as a material for the alignment layer, the coating liquid preferably contains a mixed solvent of water and an organic solvent having a defoaming property, for example, methanol.

In a mixed solvent of water and methanol, the ratio of methanol to the entire solvent is preferably 1% by mass or more, more preferably 9% by mass or more.

Thus foaming of the liquid can be prevented by adding the organic solvent, whereby defects of the surfaces of the alignment layer and of the second optically anisotropic layer can be extremely reduced.

The method for applying the coating liquid for the alignment layer is preferably a spin coating method, a dip coating method, a curtain coating method, an extrusion coating method, a rod coating method, or a roll coating method, particularly preferably a rod coating method.

The applied coating liquid preferably has a thickness of 0.1 μm to 10 μm after drying.

The temperature for the heat drying may be 20° C. to 110° C. The temperature is preferably 40° C. to 100° C., more preferably 60° C. to 100° C. to form a sufficiently crosslinked structure.

The drying time is preferably 1 minute to 36 hours, more preferably 1 minute to 30 minutes, further preferably 1 minute to 3 minutes.

The pH value of the coating liquid is preferably controlled appropriately depending or the crosslinking agent. In the case of using glutaraldehyde, the pH value is preferably in the range of 4.5 to 5.5.

<The Second Optically Anisotropic Layer>

The second optically anisotropic layer is composed of at least one polymer film. The polymer film may not be composed only of a polymer but further contain a various additives such as a plasticizer and a retardation increasing agent.

A plurality of polymer films may be used for the second optically anisotropic layer to achieve the optical anisotropy according to the invention. The optical anisotropy can be achieved using only one polymer film, and thus it is particularly preferred that the second optically anisotropic layer be composed of one polymer film.

Specifically the Rth value of the second optically anisotropic layer is preferably within a range of 100 nm to 300 nm, more preferably within a range of 100 nm to 165 nm, when measured with light having a wavelength of 550 nm.

The Re value of the second optically anisotropic layer is preferably in the range of 20 nm to 60 nm, more preferably 20 nm to 50 nm.

Figure 6:
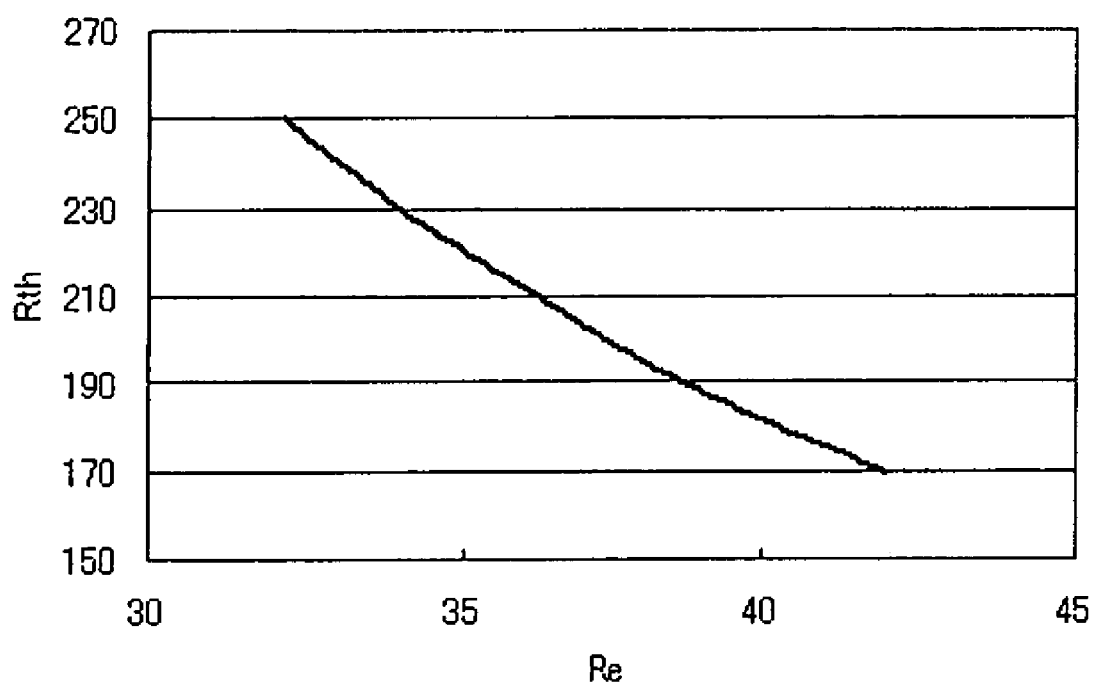
FIG. 6 is a graph showing a preferable relation between retardation values of the in-plane direction (Re) and retardation values of the thickness direction (Rth).

Furthermore, the Re and Rth values are preferably in the range of above/below 10 nm from the line shown in FIG. 6, more preferably above/below 5 nm, and further preferably on the line.

The polymer film preferably contains a cellulose-based polymer, more preferably contains a cellulose ester, and further preferably contains a lower fatty acid ester of cellulose. The lower fatty acid shall means a fatty acid having at most 6 carbon atoms. The cellulose ester is preferably a cellulose acylate with 2 to 4 carbon atoms, and more preferably a cellulose acetate. A mixed fatty acid ester such as cellulose acetate propionate or cellulose acetate butyrate may be used as the cellulose ester.

The viscosity average polymerization degree (DP) of the polymer film (hereinafter, the polymer film may be referred to as cellulose acetate or cellulose acetate film) is preferably 250 or more, more preferably 290 or more. It is preferred that the cellulose acetate has a narrow molecular weight distribution of Mw/Mn measured by a gel permeation chromatography, in which Mw is a weight average molecular weight and Mn is a number average molecular weight. Specifically, the value of Mw/Mn is preferably in the range of 1.00 to 1.70, more preferably 1.30 to 1.65, further preferably 1.40 to 1.60.

The acetylation degree of the cellulose acetate is preferably in the range of 55.0% to 62.5%, more preferably 57.0% to 62.0%.

The acetylation degree means the amount of connected acetic acid moieties per unit mass of cellulose. The value of the acetylation degree is obtained by measurement and calculation using ASTM D-817-91 (test method for cellulose acetate, etc.)

In the cellulose acetate, generally the hydroxyl groups at the 2-, 3-, and 6-positions of cellulose are not equally substituted, and the substitution degree at the 6-positions is lower. In the cellulose acetate for the second optically anisotropic layer, the substitution degree at the 6-positions is preferably equal to or higher than those at the 2- and 3-positions.

The proportion of the substitution degree at the 6-positions to the total substitution degree at the 2-, 3-, and 6-positions is preferably in the range of 30% to 40%, more preferably 31% to 40%, most preferably 32% to 40%. The substitution degree at the 6-positions is preferably 0.88 or more.

The cellulose acylate and synthesizing methods thereof are described in JIII Journal of Technical Disclosure No. 2001-1745, Page 9.

<<Adjustment of Retardations>>

The retardation of the cellulose acetate is generally controlled by a method of applying an external force, such as a stretching method. A retardation increasing agent may be added to the polymer film in order to control the optical anisotropy.

It is preferred that an aromatic compound having at least two aromatic rings is used as the retardation increasing agent.

The amount of the aromatic compound is preferably within the range of 0.01 parts by mass to 30 parts by mass per 100 parts by mass of the polymer. Two of more aromatic compounds may be used in combination. The aromatic rings of the aromatic compound include aromatic hydrocarbon rings and aromatic heterocycles.

The retardation increasing agent is described in European Patent No. 0911656, JP-A No. 2000-111914, and JP-A No. 2000-275434.

The hygroscopic expansion coefficient of the cellulose acetate film is preferably $30 \times 10^{-5}$/% relative humidity or less, more preferably $15 \times 10^{-5}$/% relative humidity or less, most preferably $10 \times 10^{-5}$/% relative humidity or less.

Smaller hygroscopic expansion coefficient is more preferred, though the hygroscopic expansion coefficient is generally $1.0 \times 10^{-5}$/% relative humidity or more. The hygroscopic expansion coefficient represents length variation of a sample by changing relative humidity at a constant temperature. By controlling the hygroscopic expansion coefficient, frame-like increase of the transmittance (the light leakage due to distortion.) can be prevented while maintaining the optical compensation function of the optical compensatory film.

In an example of measuring the hygroscopic expansion coefficient, first a sample having a width of 5 mm and a length of 20 mm is cut out from a produced polymer film, and hung under conditions of 25° C. and 20% relative humidity ($R_0$) while fixing one end of the sample. A 0.5-g weight was attached to the other end of the sample and left for 10 minutes, and the length ($L_0$) of the sample is measured.

Then, the humidity is changed to 80% relative humidity ($R_1$) while keeping the temperature at 25° C. and the length ($L_1$) is measured. The hygroscopic expansion coefficient can be calculated using the following equation. Total 10 samples of a polymer film are subjected to the measurement to obtain an average value.

Hygroscopic expansion coefficient [/% relative humidity]=$\{(L_1-L_0)/L_0\}/(R_1-R_0)$ To reduce the dimensional change of the cellulose acetate film due to moisture absorption, a hydrophobic compound is preferably added to the film. The hydrophobic compound may be in the form of particles.

The hydrophobic compound is preferably selected from plasticizers and degradation inhibitors.

The hydrophobic compound preferably has an aliphatic or aromatic hydrocarbon group as a hydrophobic group.

The mass ration of the hydrophobic compound is preferably in the range of 0.01% to 10% by mass based on the resultant polymer solution (dope).

A method of reducing the free volume in the polymer film is also effective for reducing the dimensional change caused by moisture absorption.

For example, the free volume is reduced when a residual solvent amount is lower in a solvent casting method described later. The polymer film is preferably dried under such a condition that the residual solvent amount is in the range of 0.01% by mass to 1.00% by mass based on the polymer film.

Examples of additives for the polymer film include ultraviolet resistant agents, releasing agents, antistatic agents, degradation inhibitors (such as antioxidants, peroxide decomposing agents, radical inhibitors, metal deactivators, acid scavengers, and amines), and infrared absorbents.

In a case where the polymer film has a plurality of layers, the layers may contain different types and amounts of the additives. The additives are described in JIII Journal of Technical Disclosure No. 2001-1745, Page 16 to 22.

The additive content of the polymer film is generally in the range of 0.001% by mass to 25% by mass.

The cellulose acetate film is preferably produced in a solvent casting method. In the solvent casting method, a solution (dope) prepared by dissolving a polymer material in an organic solvent is used for producing the film.

The organic solvent preferably contains a solvent selected from ethers having 3 to 12 carbon atoms, ketones having 3 to 12 carbon atoms, esters having 3 to 12 carbon atoms, and halogenated hydrocarbons having 1 to 6 carbon atoms. The ethers, ketones, and esters may have a cyclic structure. A compound having at least two of ether, ketone, and ester functional groups (—O—, —CO—, and —COO—) may be used as the organic solvent.

The organic solvent may have another functional group such as an alcoholic hydroxyl group. The carbon number of the organic solvent having two or more types of functional groups may be within the range of the compound having one of the functional group.

Examples of ethers having 3 to 12 carbon atoms include diisopropyl ether, dimethoxymethane, dimethoxy ethane, 1,4-dioxane, 1,3-dioxolane, tetrahydrofuran, anisole, and phenetole.

Examples of ketones having 3 to 12 carbon atoms include acetone, methyl ethyl ketone, diethyl ketone, diisobutyl ketore, cyclohexanone, and methylcyclohexanone.

Examples of esters having 3 to 12 carbon atoms include ethyl formate, propyl formate, pentyl formate, methyl acetate, ethyl acetate, and pentyl acetate.

Examples of the organic solvents having two or more types of functional groups include 2-ethoxyethyl acetate, 2-methoxyethanol, and 2-butoxyethanol.

The carbon number of the halogenated hydrocarbon is preferably 1 or 2, most preferably 1. A halogen of the halogenated hydrocarbon is preferably chlorine. The ratio of halogen-substituted hydrogen in the halogenated hydrocarbon is preferably in the range of 25 mol % to 75 mol %, more preferably 30 mol % to 70 mol %, further preferably 35 mol % to 65 mol %, most preferably 40 mol % to 60 mol %. Methylene chloride is typically used as the halogenated hydrocarbon. Two or more of organic solvents may be used as a mixture.

The cellulose acetate solution may be prepared in a common method. Herein, the common method shall mean a process in which the preparation is carried out at 0° C. or higher (at an ordinary temperature or a high temperature). The solution may be prepared using a method and apparatus for preparing a dope by solvent casting. In the common method, the organic solvent is preferably a halogenated hydrocarbon, particularly methylene chloride. The amount of the cellulose acetate is controlled such that the resulting solution has a cellulose acetate content of 10% by mass to 40% by mass. The cellulose acetate content is further preferably 10% by mass to 30% by mass. Additives to be hereinafter described may be added to the organic solvent (the main solvent). The solution can be prepared by stirring the cellulose acetate and organic solvent at an ordinary temperature (0° C. to 40° C.). In a case where the solution has a high concentration, the solution may be stirred under pressure and heat conditions.

Specifically the cellulose acetate and the organic solvent are put in a pressurized vessel and closed, and are then stirred under increased pressure while heating at a temperature higher than the boiling point of the solvent without boiling the solvent. The heating temperature is preferably 40° C. or higher, more preferably 60° C. to 200° C., further preferably 80° C. to 110° C.

The components may be roughly premixed and put into a vessel. Or the components may be separately put into the vessel.

The vessel preferably is preferably configured for stirring the components. The inner pressure of the vessel may be increased by introducing an inert gas such as ritrogen gas thereto.

Alternatively, the inner pressure may be increased by heating and increasing the solvent vapor pressure. The components may be added under the increased pressure after the vessel is closed. In the case of the heating, the vessel is preferably heated from the outside.

For example, the vessel may be heated by a jacket type heating apparatus.

Further, the vessel may be heated such that a plate heater is placed on the outside of the vessel, a pipe is connected thereto, and a liquid is circulated in the pipe. The components are preferably stirred by an impeller formed in the vessel.

The impeller preferably has such a length that it reaches close to the vessel wall. A scrape blade is preferably formed on the end of the impeller to interchange the liquid on the vessel wall.

The vessel may contain a measuring instrument such as a pressure indicator or a thermometer. Each component is dissolved in the solvent in the vessel. The prepared dope is isolated from the vessel after cooling, or is isolated and then cooled by, for example, a heat exchanger.

The solution may be prepared by a cooling dissolution method. By the cooling dissolution method, the cellulose acetate can be dissolved even in an organic solvent, in which it is hardly dissolved by a common method.

In the case of using a solvent in which the cellulose acetate can be dissolved by a common method, a uniform solution can be rapidly obtained by the cooling dissolution method.

In the cooling dissolution method, first the cellulose acetate is gently added to the organic solvent while stirring at room temperature. The amount of the cellulose acetate is preferably controlled such that the cellulose acetate content of the mixture is in the range of 10% by mass to 40% by mass.

The cellulose acetate content is more preferably in the range of 10% by mass to 30% by mass. Further, additives hereinafter described may be added to the mixture.

Then the mixture is cooled to a temperature in the range of −100° C. to −10° C. The temperature is more preferably in the range of −80° C. to −10° C., further preferably −50° C. to −20° C., most preferably −50° C. to −30° C.

The mixture may be cooled in a dry ice bath, a methanol bath (−75° C.), a cooled diethylene glycol solution (−30° C. to −20° C.) and the like.

In the cooling step, the mixture of the cellulose acetate and the organic solvent is solidified.

A cooling rate is preferably 4° C./minute or higher, further preferably 8° C./minute or higher, most preferably 12° C./minute or higher.

A higher cooling rate, for example, 100° C./second, is further preferable. A cooling rate is obtained by dividing a temperature difference between the start and end of the cooling by the time required for completing the cooling.

The resulting mixture is heated to a temperature in the range of 0° C. to 200° C. so that the cellulose acetate is dissolved in the organic solvent. The temperature is more preferably in the range of 0° C. to 150° C., further preferably 0° C. to 120° C., most preferably 0° C. to 50° C.

The mixture may be heated by only leaving at room temperature or using a heating bath. The heating rate is preferably 4° C./minute or higher, more preferably 8° C./minute or higher, most preferably 12° C./minute or higher. Higher rate is more preferable.

A higher heating rate is, for example, 100° C./minute. A heating rate is obtained by dividing a temperature difference between the start and end of the heating by the time required for completing the heating. A uniform solution can be obtained in this manner.

In a case where the dissolution is insufficient, the steps of cooling and heating may be repeated. The dissolution can be evaluated by visually observing the solution from outside.

In the cooling dissolution method, a closable vessel is preferably used to prevent water contamination caused by dew condensation in the cooling step. During the cooling/heating operation, the dissolving time can be shortened by cooling under an increased pressure and heating under a reduced pressure, and it is preferred that a pressure-resistant vessel is used in this case. When a cellulose acetate having an acetylation degree of 60.9% and a viscosity average polymerization degree of 299 is dissolved in methyl acetate by the cooling dissolution method, thus prepared 20% by mass solution has about 33° C. of a pseudo phase transition point between the sol and gel states, obtained by differential scanning calorimetry (DSC), and the solution is in the uniform gel state at the point or lower.

Thus, the solution has to be maintained at the pseudo phase transition temperature or higher, preferably at a temperature of about 10° C. higher than the gel phase transition temperature. It should be noted that the pseudo phase transition temperature depends on the acetylation degree and viscosity average polymerization degree of the cellulose acetate, the solution concentration, and the organic solvent.

The cellulose acetate film may be produced from the cellulose acetate solution (the dope) thus prepared in a solvent casting method.

The dope is cast on a drum or band, and the solvent is evaporated to thereby form the film.

It is preferred that the concentration of the dope be controlled before the casting such that the solid content is 18% to 35%.

The surface of the drum or band is preferably in a mirror finished state.

The casting and drying steps in the solvent casting method are described in U.S. Pat. Nos. 2,336,310, 2,367,603, 2,492,078, 2,492,977, 2,492,978, 2,607,704, 2,739,069, and 2,739,070, British Patent No. 640731 and 736892, Japanese Patent Application Publication (JP-B) No. 454554 and No. 49-5614, and JP-A No. 60-176834, 60-203430, and 62-115035.

The dope is preferably cast on the drum or band having a surface temperature of 10° C. or lower. The dope is preferably air-dried for 2 seconds or more after the casting.

The resultant film may be peeled off from the drum or band and further dried by hot air while successively changing the air temperature within the range of 100° C. to 160° C. to thereby evaporate the residual solvent.

This above method is described in JP-B No. 05-17844. According to the method, the time between the casting and the peeling can be reduced. To carry out the method, the dope has to be converted into a gel at the surface temperature of the drum or band in the casting.

The prepared cellulose acylate liquid (the dope) may be formed into a film by double or more casting. In this case, the cellulose acylate film is preferably formed by the solvent casting method.

The dope is cast on a drum or band, and the solvent is evaporated to form the film.

It is preferred that the concentration of the dope be controlled before the casting such that the solid content is in the range of 10% to 40%. The surface of the drum or band is preferably in the mirror finished state.

In the case of casting a plurality of the cellulose acylate liquids, the film may be formed by casting the cellulose acylate liquids into layers respectively from a plurality of casting openings formed at some intervals in the moving direction of a substrate as described in JP-A No. 61-156414, JP-A No. 11-122419, and JP-A No. 11-198285, etc.

The film may be formed by casting the cellulose acylate liquids from two casting openings as described in JP-B No. 60-27562, JP-A No. 61-94724, JP-A No. 61-947245, JP-A No. 61-104813, JP-A No. 61-158413, and JP-A No. 61-134933. Further, the film may be formed in a cellulose acylate casting method in which flow of a high-viscosity cellulose acylate liquid with a low-viscosity cellulose acylate liquid, and high- and low-viscosity cellulose acylate the liquids are extruded simultaneously as described in JP-A No. 56-162617.

Further, a film can be produced using two casting openings, wherein the first film formed on a substrate using the first casting opening is peeled off and another film is formed on the substrate side of the film using the second casting opening.

The method is described in, for example, JP-B No. 44-20235. The cellulose acylate liquids for the casting may be the same or different liquids without particular restrictions. To form a plurality of cellulose acylate layers with desired functions, the cellulose acylate liquids suitable for the functions may be extruded from the casting openings respectively.

The cellulose acylate liquid of the present invention may be cast together with another liquid for another functional layer such as an adhesive layer, a dye layer, an antistatic layer, an antihalation layer, a UV absorbing layer, or a polarizing layer simultaneously.

In the case of conventional single liquid layers, extrusion of a high-concentration high-viscosity cellulose acylate liquid is required to obtain a desired film thickness, resulting in poor stability of the cellulose acylate liquid, and thereby suffering problems of generation of solids, spit defects, poor flatness, etc.

In view of solving the problems, a plurality of high-viscosity cellulose acylate liquids can be extruded onto a support by casting the liquids simultaneously from casting openings, resulting in excellent flatness and surface properties. Further, the drying load can be reduced by using high-concentration cellulose acylate liquids, thereby increasing the speed of producing the film.

<<Plasticizer>>

A plasticizer may be added to the cellulose acetate film in order to improve the mechanical properties and drying speed.

The plasticizer may be a phosphoric acid ester or a carboxyic acid ester.

Examples of the phosphoric acid esters include triphenyl phosphate (TPP), biphenyldiphenyl phosphate, and tricresyl phosphate (TCP).

Typical carboxylic acid esters include phthalate esters and citrate esters. Examples of the phthalate esters include dimethyl phthalate (DMP), diethyl phthalate (DEP), dibutyl phthalate (DBP), dioctyl phthalate (DOP), diphenyl phthalate (DPP), and diethylhexyl phthalate (DEHP).

Examples of the citrate esters include triethyl 0-acetylcitrate (OACTE) and tributyl 0-acetylcitrate (OACTB).

Examples of the other carboxylic acid esters include butyl oleate, methylacetyl ricinoleate, dibutyl sebacate, and various trimellitic acid esters. The plasticizer is preferably a phosphoric acid ester.

The mass ratio of the plasticizer to the cellulose ester is preferably in the range of 0.1% by mass to 25% by mass, more preferably 1% by mass to 20% by mass, most preferably 3% by mass to 15% by mass.

<<Surface Treatment>>

The cellulose acetate film is preferably subjected to a surface treatment. The surface treatments include corona discharge treatments, glow discharge treatments, flame treatments, acid treatments, alkali saponification treatments, and ultraviolet ray irradiation treatments. The surface treatments are described in JIII Journal of Technical Disclosure No. 2001-1745, page 30 to 32.

The alkali saponification treatment may be achieved by soaking the cellulose acetate film in a saponification solution or by coating the cellulose acetate film with a saponification solution, and is preferably carried out by the coating method.

Examples of the coating methods include dip coating methods, curtain coating methods, extrusion coating methods, bar coating methods, and E coating methods. The alkali is preferably a hydroxide of an alkali metal such as potassium or sodium. Thus, the alkali treatment solution is preferably a hydroxide solution containing the alkali metal. In the solution, the normal concentration of the hydroxide ions is preferably in the range of 0.1N to 3.0 N.

A solvent, a surfactant, or a wetting agent, such as a diol or glycerin, excellent in wetting properties to the film may be added to the alkali treatment solution in order to improve the solution with respect to the wetting properties to the second optically anisotropic layer and the stability. The solvent excellent in the wetting properties to the film is preferably an alcohol such as isoprodyl alcohol, n-butanol, methanol, or ethanol. The additives for the alkali treatment solution are described in JP-A No. 2002-82226 and WO 02/46809.

Instead of or in addition to the surface treatment, an undercoat layer may be formed as described in JP-A No. 07-333433. A plurality of the undercoat layers may be formed.

For example, as described in JP-A No. 11-248940, a polymer layer having a hydrophobic group and a hydrophilic group is formed as a first undercoat layer, and a hydrophilic polymer layer excellent in adhesion to the alignment layer is formed thereon as a second undercoat layer.

(OCB Mode Liquid Crystal Display)

An OCB mode liquid crystal cell is a bend alignment mode liquid crystal cell composed of rodlike liquid crystal molecules, and wherein the molecules in the upper portion and the molecules in the lower portion are aligned in substantially opposite directions (symmetrically).

A liquid crystal display using such the bend alignment mode liquid crystal cell is disclosed in U.S. Pat. Nos. 4,583, 825 and 5,410,422.

The bend alignment mode liquid crystal cell has a self-optical compensatory function because the rodlike liquid crystal molecules are symmetrically aligned.

Thus, the liquid crystal mode is referred to also as an OCB (Optically Compensatory Bend) liquid crystal mode.

In the OCB mode liquid crystal cell, the alignment state is such that the rodlike liquid crystal molecules stand up in the central part of the cell and lie down in the vicinity of the substrates at the time of black level as TN mode cells.

The value of ($\Delta n \times d$) of the liquid crystal cell is preferably in the range of 50 nm to 1,000 nm, more preferably 500 nm to 1,000 nm.

EXAMPLES

The (present) invention will be described in more detail below with reference to Examples. Various changes may be made on materials, amounts, ratios, treatment details, treatment procedures, etc. in Examples without departing from the scope of the invention. Thus, the following specific examples should not be considered restrictive.

Example 1

<Preparation of Cellulose Acetate Solution>

The following compositions were added to a mixing tank and stirred under heating to dissolve the components, so that a cellulose acetate solution was prepared.
Composition of the Cellulose Acetate Solution
Cellulose acetate having acetylation degree of 60.9%—100 parts by mass
Triphenyl phosphate—7.8 parts by mass
Biphenyldiphenyl phosphate—3.9 parts by mass
Methylene chloride—300 parts by mass
Methanol—45 parts by mass
<Preparation of Retardation Increasing Agent Solution>

To another mixing tank, 4 parts by mass of cellulose acetate having an acetylation degree of 60.9% (linter), 25 parts by mass of the retardation increasing agent shown in the following structural formula, 0.5 parts by mass of silica particles having an average particle size of 20 nm, 80 parts by mass of methylene chloride, and 20 parts by mass of methanol were added, and stirred under heating to prepare a retardation increasing agent solution.

Structural Formula A

Structural formula (A)

[Chemical structure of a triazine with three aniline substituents bearing methyl groups]

<Preparation of Cellulose Acetate Film>

18.5 parts by mass of the above-mentioned retardation increasing agent solution was mixed with 470 parts by mass of the above-mentioned cellulose acetate solution, and the resultant mixture was well stirred to prepare a dope. The mass ratio of the retardation increasing agent to the cellulose acetate was 3.5%.

The film containing 35% by mass of residual solvent was peeled from the band, and transversely stretched at a stretch ratio of 38% using a film tenter at 140° C. After removing a clip, the resulting film was dried at 130° C. for 45 seconds to prepare a cellulose acetate film (the second optically anisotropic layer). The cellulose acetate film had a residual solvent content of 0.2% by mass and a thickness of 92 μm.

<Measurement of Optical Properties of Cellulose Acetate Film>

The cellulose acetate film was measured with respect to a Re value (Re (550 nm)) at a wavelength of 550 nm using an automatic Birefringence-meter KOBRA 21ADH manufactured by Oji Scientific Instruments.

Further, Re values of the cellulose acetate film were measured at elevation angles of 40° (Re (40°)) and −40° (Re (−40°)) using an in-plane retardation axis of as an elevation axis and the result is shown in Table 1.

Using parameters of the thickness and refractive index nx in the retardation axis direction in view of fitting the measured values Re(550 nm), Re(40°), and −Re(40°), the Rth value was determined. The result is shown in Table 1.

<Saponification of Cellulose Acetate Film>

A 1.5 mol/L potassium hydroxide isopropyl alcohol solution was applied to one surface of the produced cellulose acetate film such that the application amount was 25 ml/m$^2$, left at 25° C. for 5 seconds, washed with water flow for 10 seconds, and dried with airflow temperature at 25° C. Only the one surface of the cellulose acetate film was saponified in this manner.

<Formation of Alignment Layer>

An alignment layer coating liquid having the following composition was applied to the saponified surface of the cellulose acetate film (the second optically anisotropic layer) using a #14 wire bar coater at a ratio of 24 ml/m$^2$. The applied liquid was dried with hot air of 60° C. for 60 seconds and further dried with hot air of 90° C. for 150 seconds, and whereby an alignment layer was obtained.

Then the resulting layer was subjected to a rubbing treatment at an angle of 45° against the stretching direction of the second optically anisotropic layer, which was approximately equal to the retardation axis direction.

Composition of Alignment Layer Coating Liquid
Modified polyvinyl alcohol shown in the following structural formula (B)—10 parts by mass
Water—371 parts by mass
Methanol—119 parts by mass
Glutaraldehyde (cross-linking agent)—0.5 parts by mass Structural formula (B)

$$—(CH_2—CH)_{87.8}—$$
$$\quad\quad\quad\quad |$$
$$\quad\quad\quad\quad OH$$

$$—(CH_2—CH)_{0.2}—$$
$$\quad\quad\quad\quad |$$
$$\quad\quad\quad\quad O$$
$$\quad\quad\quad\quad |$$
$$\quad\quad\quad\quad CO$$
$$\quad\quad\quad\quad |$$
$$\quad\quad\quad\quad [C_6H_4]$$
$$\quad\quad\quad\quad |$$
$$\quad\quad\quad\quad O—(CH_2)_4—O—CO—CH=CH_2$$

$$—(CH_2—CH)_{12.0}—$$
$$\quad\quad\quad\quad |$$
$$\quad\quad\quad\quad O$$
$$\quad\quad\quad\quad |$$
$$\quad\quad\quad\quad CO$$
$$\quad\quad\quad\quad |$$
$$\quad\quad\quad\quad CH_3$$

<Formation of First Optically Anisotropic Layer>

91 parts by mass of the discotic compound shown in the following structural formula (C), 9 parts by mass of an ethylene oxide-modified trimethylolpropane triacrylate V#360 available from Osaka Organic Chemical Industry Ltd., 1.5 parts by mass of a cellulose acetate butyrate CAB531-1 available from Eastman Chemicals Company, 0.91 parts by mass of a mixture of monoethyl citrare and diethyl citrare, 3 parts by mass of a photopolymerization initiator IRGACURE 907 available from Ciba-Geigy, and 1 part by mass of a sensitizer KAYACURE DETX available from Nippon Kayaku Co., Ltd. were dissolved in 204.0 parts by mass of methyl ethyl ketone to obtain a coating liquid.

The coating liquid was applied to the alignment layer using a #2.7 wire bar at an application rate of 4.7 ml/m². This was attached to a metal frame and heated at 130° C. for 2 minutes in a constant temperature bath to align the discotic compound.

The resultant laminate was then irradiated with ultraviolet ray at 90° C. for 1 minute using a 120-W/cm high-pressure mercury vapor lamp to polymerize the discotic compound, and was cooled to the room temperature. Thus a first optically anisotropic layer was formed on the alignment layer which is formed on the cellulose acetate film (the second optically anisotropic layer).

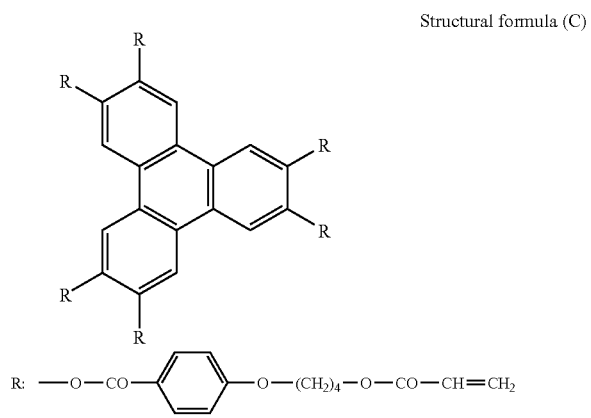

Structural formula (C)

<Measurement of Optical Properties of First Optically Anisotropic Layer>

A Re value (Re (550 nm)) of the first optically anisotropic layer was measured at a wavelength of 550 nm using an automatic birefringence meter KOBRA-21ADH manufactured by Oji Scientific Instruments.

Further, the retardation values Re (40°) and Re (−40°) were measured at elevation angles of 40° and −40° against an in-plane slow axis serving as an elevation axis. The result and calculated values of Re (40°)/Re (−40°) are shown in Table 1.

<Measurement of Optical Properties of Optical Compensatory Film>

The Re value (Re (550 nm)) of the optical compensatory film was measured at a wavelength of 550 nm using the automatic birefringence meter KOBRA-21ADH manufactured by Oji Scientific Instruments.

Further, the retardation values Re (40°) and Re (−40°) were measured at elevation angles of 40° and −40° against an in-plane slow axis serving as an elevation axis. The result and calculated values of Re (40°)/Re (−40°) are shown in Table 1.

(Production of Ellipsoidal Polarizing Plate)

The Iodine was adsorbed onto a stretched polyvinyl alcohol film to prepare a polarizing film.

The second optically anisotropic layer of the produced optical compensatory film was bonded to one side of the polarizing film using a polyvinyl alcohol adhesive. They were positioned such that the retardation axis of the second optically anisotropic layer was parallel to the transmission axis of the polarizing film.

A commercially available cellulose triacetate film, FUJI TAC TD80UF manufactured by Fuji Photo Film Co., Ltd., was subjected to a saponification treatment in the same manner as above described, and bonded to the other side of the polarizing film (the side not having the optical compensatory film) using a polyvinyl alcohol adhesive. An ellipsoidal polarizing plate was produced in this manner.

<Production of Bend Alignment Mode Liquid Crystal Cell>

A polyimide film was formed as an alignment layer on a glass substrate having an ITO electrode, and then was subjected to a rubbing treatment. During the rubbing, the contact length of the rubbing cloth used for the rubbing with the alignment layer was controlled at 0.5 mm. The value is shown in FIG. 2.

Thus obtained two glass substrates were made to face each other such that the rubbing directions were parallel, and the cell gap was set at 5.0 μm.

A liquid crystalline compound having Δn of 0.1396 (ZLI1132 available from Merck) was injected to the liquid crystal cell, to produce a bend alignment mode liquid crystal cell.

<Measurement of Pretilt Angle>

Pretilt angle of the bend alignment liquid crystal cell thus produced was measured with Optipro (manufactured by Thing Tech Co., Ltd.). The result is shown in FIG. 2.

(Production and Evaluation of Liquid Crystal Display)

<Production of Liquid Crystal Display>

A liquid crystal display having the liquid crystal cell enclosed in between a pair of the polarizing plates, in which each of the optically anisotropic layers of the polarizing plates is placed facing the glass substrates of the liquid crystal cell, was produced.

The liquid crystal cell and the pair of the polarizing plates were arranged such that the rubbing direction of the liquid crystal cell was antiparallel to the rubbing directions of the facing optically anisotropic layers.

<Measurement of Black Voltage>

The produced liquid crystal display was placed on a backlight, and a 55-Hz square wave voltage was applied to the bend alignment mode liquid crystal cell (the facing glass substrates). The voltage was changed, so that a voltage (hereinafter referred to as a black voltage), at which the display showed the minimum black luminance (front luminance), was evaluated with a luminance meter, TOPCON BM-5. The result is shown in Table 2.

<Measurement of Vcr>

Figure 5:
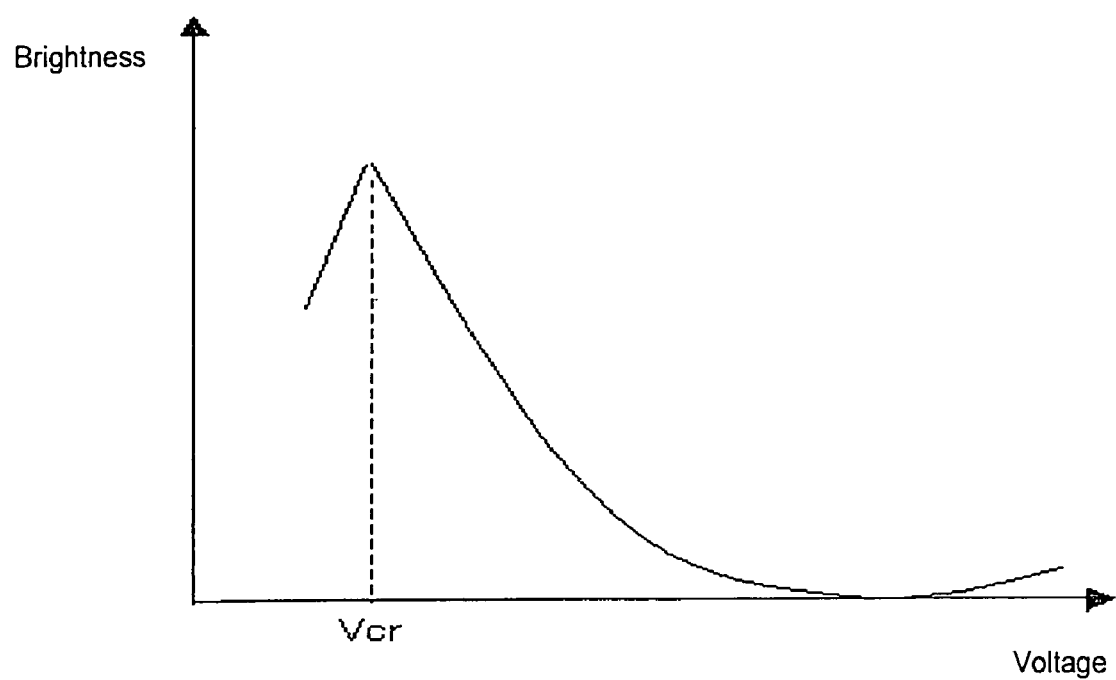
FIG. 5 is a graph showing a relation between voltage and brightness to illustrate a white voltage (Vcr) level.

Next, brightness was measured with the luminance meter TOPCON BM-5 in the same manner as above described, while reducing the voltage. As shown in FIG. 5, brightness increases with reduction of the voltage until the voltage reaches a level, and at voltage lower than the level, drastically decreased brightness was observed. Hereinafter, the level of voltage from which brightness drastically decreases is referred to as a white voltage (Vcr). The result is shown in Table 2.

<Measurement of Contrast>

Then the black luminance (brightness when a black voltage is applied) and white luminance (brightness when displaying white or a white voltage is applied) at the center of the display were measured with the luminance meter TOPCON BM-5, whereby the contrast was calculated by dividing measured white brightness by measured black brightness (the result is shown in Table 2).

<Evaluation of Viewing Angle> was evaluated based on an isocontrust contour obtained with EZ Contrast (manufactured by ELDIM Company) to evaluate the viewing angle properties of the liquid crystal display.

Viewing angles, the angles in which contrast ratio is 10:1 or more and black tone reversal is not recognized, of the liquied crystal display produced in EXAMPLE 1 were evaluated using EZ Contrast160D, manufactured by ELDIM Company, at eight steps from black displaying L1 to white displaying L8 using the following criteria. The result is shown in Table 2.

Criteria for the Viewing Angle Evaluation

A: Left, right, up and down viewing angles of 120° (polar angle) or broader

B: Left, right, up and down viewing angles of 80° (polar angle) or broader to less than 120° (polar angle)

C: Left, right, up and down viewing angles of less than 80° (polar angle)

Example 2

<Production of Cellulose Acetate Film>

A cellulose acetate film was produced in the same manner as of EXAMPLE 1.

<Saponification of Cellulose Acetate Film>

Only one surface of the cellulose acetate film was saponified in the same manner as of EXAMPLE 1.

<Formation of Alignment Layer>

Only one surface of the cellulose acetate film was saponified, and an alignment layer was formed on the saponified surface in the same manner as of EXAMPLE 1. Then, the alignment layer was subjected to a rubbing treatment in the same manner as of EXAMPLE 1.

<Formation of First Optically Anisotropic Layer>

A first optically anisotropic layer was formed on an alignment layer which is formed on the cellulose acetate film (the second optically anisotropic layer) in the same manner as of EXAMPLE 1 to thereby obtain an optical compensatory film of EXAMPLE 2.

<Measurement of Optical Properties of the First Optically Anisotropic Layer>

As in the same manner of EXAMPLE 1, Re values, Re (40°), Re (−40°) and Re (550 nm) of the first optically anisotropic layer were measured, and thus (40°)/Re (−40°) was calculated. The result and calculated values of Re (40°)/Re (−40°) are shown in Table 1.

(Production of Ellipsoidal Polarizing Plate)

Except the optical compensatory film obtained in Example 2 was used, a polarizing film and an ellipsoidal polarizing plate were produced in the same manner as of Example 1.

(Production of Bend Alignment Liquid Crystal Cell)

A bend alignment liquid crystal cell was produced in the same manner as of Example 1 except that a perpendicular alignment layer (JLS-682, manufactured by JSR Corporation) made of polyimides and a horizontal alignment layer (AL4552, manufactured by JSR Corporation) made of polyimides were used for alignment layers and the contact length of the rubbing cloth with the alignment layers were controlled at 2.00 mm.

<Measurement of Pretilt Angle>

The pretilt angle of the produced bend alignment liquid crystal cell was measured in the same manner as of Example 1. The result is shown in Table 2.

(Production and Evaluation of Liquid Crystal Display)

<Production of Liquid Crystal Display>

A liquid crystal display was produced in the same manner as of Example 1.

<Measurement of Black Voltage, Vcr and Contrast>

Levels of a black voltage and Vcr, and contrast were measured in the same manner as of Example 1. The results are shown in Table 2.

<Evaluation of Viewing Angle>

The viewing angles of the liquid crystal display produced in Example 2 was measured and evaluated in the same manner as of Example 2. The result is shown in Table 2.

Example 3

<Production of Cellulose Acetate Film>

A cellulose acetate solution and a retardation increasing agent solution were prepared and a cellulose acetate film was produced in the same manner as of Example 1.

Only one surface of the cellulose acetate film was saponified, and an alignment layer was formed on the saponified surface in the same manner as of EXAMPLE 1. Then, the alignment layer was subjected to a rubbing treatment in the same manner as of EXAMPLE 1.

<Measurement of Optical Properties of First Optically Anisotropic Layer>

As in the same manner of EXAMPLE 1, Re values, Re (40°), Re (−40°) and Re (550 nm) of the first optically anisotropic layer were measured, and thus (40°)/Re (−40°) was calculated. The result and calculated values of Re (40°)/Re (−40) are shown in Table 1.

(Production of Ellipsoidal Polarizing Plate)

A polarizing film was produced in the same manner as of Example 1, and an ellipsoidal polarizing plate having the optical compensatory film of Example 3 and the polarizing film was produced.

(Production of Bend Alignment Liquid Crystal Cell)

A bend alignment liquid crystal cell was produced in the same manner as of Example 1.

<Measurement of Pretilt Angle>

The pretilt angle of the produced bend alignment liquid crystal cell was measured in the same manner as of Example 1. Measured pretilt angle is shown in Table 2.

(Production and Evaluation of Liquid Crystal Display)

<Production of Liquid Crystal Display>

A liquid crystal display was produced in the same manner as of Example 1.

<Measurement of Black Voltage, Vcr and Contrast>

Levels of a black voltage and Vcr, and contrast were measured in the same manner as of Example 1. The results are shown in Table 2.

<Evaluation of Viewing Angle>

The viewing angles of the liquid crystal display produced in Example 3 was measured and evaluated in the same manner as of Example 1. The result is shown in Table 2.

Example 4

<Production of Bend Alignment Liquid Crystal Cell>

A bend alignment liquid crystal cell was produced in the same manner as of Example 1 except that the cell gap was set at 7.0 µm.

<Measurement of Pretilt Angle>

The pretilt angle of the produced bend alignment liquid crystal cell was measured in the same manner as of Example 1. The result is shown in Table 2.

(Production of Liquid Crystal Display)

A liquid crystal display was produced in the same manner as of Example 1.

<Measurement of Vcr and Contrast>

Vcr level and contrast were measured in the same manner as of Example 1 except that black voltage that is applied to between the liquid crystal cell and the electrode substrate was set at 7V. Obtained values of Vcr and contrast are shown in Table 2.

<Evaluation of Viewing Angle>

The viewing angles of the liquid crystal display produced in Example 4 was measured and evaluated in the same manner as of Example 1. The result is shown in Table 2.

Example 5

<Production of Cellulose Acetate Film>

A cellulose acetate solution and a retardation increasing agent solution were prepared and a cellulose acetate film was produced in the same manner as of Example 1.

Only one surface of the cellulose acetate film was saponified, and an alignment layer was formed on the saponified surface in the same manner as of EXAMPLE 1. Then, the alignment layer was subjected to a rubbing treatment in the same manner as of EXAMPLE 1.

<Formation of First Optically Anisotropic Layer>

A coating liquid containing a discotic compound of the following components was straight applied to the above produced alignment layer using a #3.2 wire bar. Then, hot air of 100° C. was applied thereto for 30 seconds, and further hot air of 130 ° C. was applied thereto for 60 seconds in order to dry the coating liquid and obtain sufficient alignment of the discotic compound. Subsequently, the resultant laminate was irradiated with ultraviolet ray to fix the alignment of the liquid crystal compound, and thereby an optically anisotropic layer was formed. Finally, an optical compensatory film was obtained by straight saponifying an opposite surface of the cellulose acetate film surface on which the optically anisotropic layer was formed.

Composition of Optically Anisotropic Layer Coating Liquid

A discotic compound shown in the following structural formula (D)—41.01 parts by mass Ethylene oxide-modified trimethylolpropane triacrylate (V#360, manufactured by Osaka Organic Chemical Industry Ltd.)—4.06 parts by mass Cellulose acetate butyrate (CAB 551-0.2, manufactured by Eastman Chemical Company)—0.34 parts by mass Cellulose acetate butyrate (CAB 531-1, manufactured by Eastman Chemical Company)—0.11 parts by mass A fluorinated aliphatic group containing polymer shown in the following structural formula (E)—0.03 parts by mass A fluorinated aliphatic group containing polymer shown in the following structural formula (F)—20.23 parts by mass A photopolymerization initiator (IRGACURE 907, manufactured by Ciba-Geigy)—1.35 parts by mass A radiosensitizing agent (KAYACURE DETX, manufactured by Nippon Kayaku Co., Ltd.)—0.45 parts by mass A methyl ethyl ketone—107 parts by mass Structural formula (D)

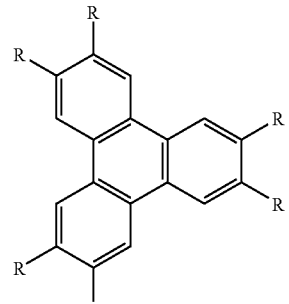

R: —O—CO—⟨⟩—O—(CH$_2$)$_4$—O—CO—CH═CH$_2$

Structural formula (E)

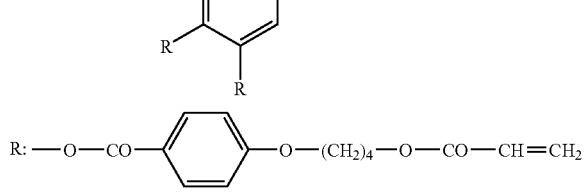

(a / b = 90 / 10 wt %)

Structural formula (F)

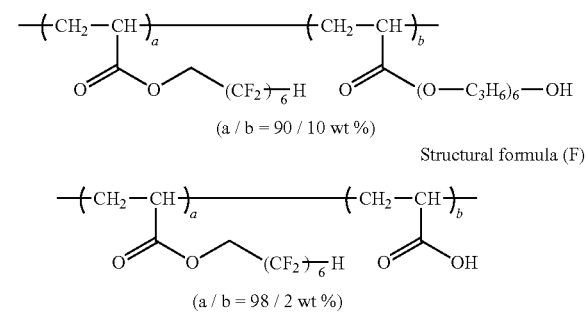

(a / b = 98 / 2 wt %)

<Measurement of Optical Properties of First Optically Anisotropic Layer>

As in the same manner of EXAMPLE 1, Re values, Re (40°), Re (−40) and Re (550 nm) of the first optically anisotropic layer were measured, and thus (40°)/Re (−40) was calculated. The result and calculated values of Re (40°)/Re (−40°) are shown in Table 1.

<Measurement of Optical Properties of Optical Compensatory Film>

As in the same manner of EXAMPLE 1, Re values, Re (40°), Re (−40°) and Re (550 nm) of the first optically anisotropic layer were measured, and thus (40°)/Re (−40°) was obtained. The result and calculated values of Re (40°)/Re (−40°) are shown in Table 1.

(Production of Ellipsoidal Polarizing Plate)

A polarizing film was produced in the same manner as of Example 1, and an ellipsoidal polarizing plate having the optical compensatory film of Example 5 and the polarizing film was produced.

(Production of Bend Alignment Liquid Crystal Cell)

A bend alignment liquid crystal cell was produced in the same manner as of Example 1.

<Measurement of Pretilt Angle>

The pretilt angle of the produced bend alignment liquid crystal cell was measured in the same manner of Example 1. The result is shown in Table 2.

(Production and Evaluation of Liquid Crystal Display)

<Production of Liquid Crystal Display>

A liquid crystal display was produced in the same manner as of Example 1.

<Measurement of Black Voltage, Vcr and Contrast>

Levels of a black voltage and Vcr, and contrast were measured in the same manner as of Example 1. The results are shown in Table 2.

<Evaluation of Viewing Angle>

The viewing angles of the liquid crystal display produced in Example 5 was measured and evaluated in the same manner as of Example 1. The result is shown in Table 2.

Comparative Example 1

<Preparation of Cellulose Acetate Film>

A cellulose acetate film (second optically anisotropic layer) was prepared in the same manner as of Example 1. The cellulose acetate film had a residual solvent content of 0.2% by mass and a thickness of 92 μm.

<Measurement of Optical Properties of Cellulose Acetate Film>

As in the same manner of EXAMPLE 1, Re values, Re (40°), Re (−40°) and Re (550 nm) of the cellulose acetate film obtained in Comparative Example 1 were measured, Rth value and (40°)/Re (−40°) were calculated. The result of Rth and calculated values of Re (40°)/Re (−40°) are shown in Table 1.

<Saponification of Cellulose Acetate Film>

Only one surface of the cellulose acetate film was saponified in the same manner as of EXAMPLE 1.

<Formation of Alignment Layer>

Only one surface of the cellulose acetate film was saponified, and an alignment layer was formed on the saponified surface in the same manner as of EXAMPLE 1. Then, the alignment layer was subjected to a rubbing treatment in the same manner as of EXAMPLE 1.

<Formation of First Optically Anisotropic Layer>

A first optically anisotropic layer was formed on an alignment layer which is formed on the cellulose acetate film (the second optically anisotropic layer) in the same manner as of EXAMPLE 1 to thereby obtain an optical compensatory film.

<Measurement of Optical Properties of First Optically Anisotropic Layer>

As in the same manner of EXAMPLE 1, Re values, Re (40°), Re (−40°) and Re (550 nm) of the first optically anisotropic layer were measured, and thus (40°)/Re (−40°) was calculated. The result and calculated values of Re (40°)/Re (−40°) are shown in Table 1.

<Measurement of Optical Properties of Optical Compensatory Film>

As in the same manner of EXAMPLE 1, Re values, Re (40°), Re (−40°) and Re (550 nm) of the first optically anisotropic layer were measured, and thus (40°)/Re (−40°) was obtained. The result and calculated values of Re (40°)/Re (−40°) are shown in Table 1.

(Production of Ellipsoidal Polarizing Plate)

An ellipsoidal polarizing plate and a polarizing film were produced in the same manner as of Example 1 except that the optical compensatory film obtained in Comparative Example 1 was used.

<Production of Bend Alignment Liquid Crystal Cell>

A bend alignment liquid crystal cell was produced in the same manner as of Example 1 except that the contact length with the alignment layer was controlled at 1.5 mm.

<Measurement of Pretilt Angle>

The pretilt angle of the produced bend alignment liquid crystal cell was measured in the same manner as of Example 1. The result is shown in Table 2.

(Production and Evaluation of Liquid Crystal Display)

<Production of Liquid Crystal Display>

A liquid crystal display was produced in the same manner as of Example 1.

<Measurement of Black Voltage, Vcr and Contrast>

Levels of a black voltage and Vcr, and contrast were measured in the same manner as of Example 1. The results are shown in Table 2.

<Evaluation of Viewing Angle>

The viewing angles of the liquid crystal display produced in Comparative Example 1 was measured and evaluated in the same manner as of Example 1. The result is shown in Table 2.

Comparative Example 2

<Preparation of Cellulose Acetate Film>

A cellulose acetate film (second optically anisotropic layer) was prepared in the same manner as of Example 1. The cellulose acetate film had a residual solvent content of 0.2% by mass and a thickness of 92 μm.

<Measurement of Optical Properties of Cellulose Acetate Film>

As in the same manner of EXAMPLE 1, Re values, Re (40°), Re (−40°) and Re (550 nm) of the cellulose acetate film obtained in Comparative Example 2 were measured, Rth value and (40°)/Re (−40°) were calculated. The result of Rth and Re values and calculated values of Re (40°)/Re (−40°) are shown in Table 1.

<Saponification of Cellulose Acetate Film>

Only one surface of the cellulose acetate film was saponified in the same manner as of EXAMPLE 1.

<Formation of Alignment Layer>

Only one surface of the cellulose acetate film was saponified, and an alignment layer was formed on the saponified surface in the same manner as of EXAMPLE 1. Then, the alignment layer was subjected to a rubbing treatment in the same manner as of EXAMPLE 1.

<Formation of First Optically Anisotropic Layer>

A first optically anisotropic layer was formed on an alignment layer which is formed on the cellulose acetate film (the second optically anisotropic layer) in the same manner as of EXAMPLE 1 to thereby obtain an optical compensatory film.

<Measurement of Optical Properties of First Optically Anisotropic Layer>

As in the same manner of EXAMPLE 1, Re values, Re (40°), Re (−40°) and Re (550 nm) of the first optically anisotropic layer were measured, and thus (40°)/Re (−40°) was obtained. The result and calculated values of Re (40°)/Re (−40°) are shown in Table 1.

<Measurement of Optical Properties of Optical Compensatory Film>

As in the same manner of EXAMPLE 1, Re values, Re (40°), Re (−40°) and Re (550 nm) of the first optically anisotropic layer were measured, and thus (40°)/Re (−40°) was obtained. The result and calculated values of Re (40°)/Re (−40°) are shown in Table 1.

(Production of Ellipsoidal Polarizing Plate)

A polarizing film was produced in the same manner as of Example 1, and an ellipsoidal polarizing plate having the optical compensatory film of Comparative Examples 2 and the polarizing film was produced.

(Production of Bend Alignment Liquid Crystal Cell)

A bend alignment liquid crystal cell was produced in the same manner as of Example 1 except that the contact length with the alignment layer was set at 2.0 mm.

<Measurement of Pretilt Angle>

The pretilt angle of the produced bend alignment liquid crystal cell was measured in the same manner as of Example 1. The result is shown in Table 2.

(Production and Evaluation of Liquid Crystal Display)

<Production of Liquid Crystal Display>

A liquid crystal display was produced in the same manner as of Example 1.

<Measurement of Black Voltage, Vcr and Contrast>

Levels of a black voltage and Vcr, and contrast were measured in the same manner as of Example 1. The results are shown in Table 2.

<Evaluation of Viewing Angle>

The viewing angles of the liquid crystal display produced in Comparative Example 2 was measured and evaluated in the same manner as of Example 1. The result is shown in Table 2.

TABLE 1

|  | First optically anisotropic layer | | Second optically anisotropic layer | |
|---|---|---|---|---|
|  | Re (0°) | Re (40°)/ Re (−40°) | Re (0°) | Rth |
| Ex. 1 | 30 | 9 | 41 | 175 |
| Ex. 2 | 30 | 9 | 41 | 175 |
| Ex. 3 | 50 | 9 | 41 | 175 |
| Ex. 4 | 30 | 9 | 41 | 175 |
| Ex. 5 | 30 | 3.7 | 41 | 175 |
| Comp. Ex. 1 | 30 | 9 | 41 | 175 |
| Comp. Ex. 2 | 30 | 9 | 41 | 175 |

TABLE 2

|  | Contact length of rubbing cloth with alignment layer (mm) | Pretilt angle | Black voltage | Vcr (White voltage) | Contrast | Viewing angle |
|---|---|---|---|---|---|---|
| Ex. 1 | 0.5 | 46 | 4.50 | 0.5 | 1,500 | A |
| Ex. 2 | 0.5 | 44 | 4.60 | 0.4 | 1,600 | A |
| Ex. 3 | 0.5 | 46 | 4.50 | 0.5 | 1,700 | B |
| Ex. 4 | 0.5 | 46 | 4.50 | 0.5 | 1,500 | B |
| Ex. 5 | 0.5 | 46 | 4.50 | 0.5 | 1,500 | B |
| Comp. Ex. 1 | 1.5 | 15 | 4.40 | 1.1 | 1,200 | C |
| Comp. Ex. 2 | 2.0 | 8 | 4.65 | 1.6 | 1,000 | C |

As shown in Table 1 and Table 2, Example 1 can provide a bend alignment mode liquid crystal cell with excellent optical compensation, and thus can provide a liquid crystal display having capability of displaying a fine image with high contrast, excellent viewing angle characteristic and suppressed tone reversal in comparison with Comparative Example 1 and 2.

The liquid crystal display of the present invention can provide high contrast and improved color variation dependency on viewing angles at black displaying particularly in VA-, IPS- and OCB-mode displays, and thus the liquid crystal display can preferably be used as a display with drastically improved viewing angle contrast.

That is to say, the liquid crystal display of the present invention provides a liquid crystal cell with optical compensation, and can improve contrast and reduce color variation dependency on viewing angles. And therefore, the liquid crystal display can preferably be used for mobile phones, monitors for personal computers, television sets and liquid crystal projectors.

What is claimed is:

1. A liquid crystal display comprising:

a pair of polarizing films, a liquid crystal cell placed between the polarizing films, an optical compensatory film placed between at least one of the polarizing films and the liquid crystal cell, wherein the optical compensatory film comprises a first optically anisotropic layer and a second optically anisotropic layer, the liquid crystal cell is a bend alignment mode cell, and a voltage applied to the liquid crystal cell in white displaying state is 1V or less;

wherein the optical compensatory film comprises a longitudinal direction and an in-plane refractive-index-reducing direction, wherein the optical compensatory film satisfies the following optical property within a plane which contains the normal line of the optical compensatory film and the direction of 45° inclined from the longitudinal direction toward the in-plane refractive-index-reducing direction:

$$9.0 < Re(40°)/Re(-40°) < 11.0,$$

where Re(40°) is a retardation value measured in a direction inclined 40°, toward the plane of the optical compensatory film, from the normal line using light having a wavelength of 550 nm, and Re(−40°) is a retardation value measured in a direction inclined 40°, to the direction opposite to the direction of Re(40°), from the normal line using light having a wavelength of 550 nm.

2. The liquid crystal display according to claim 1, wherein an in-plane retardation value of the first optically anisotropic layer at light having a wavelength of 550 nm, or Re (550 nm), is in the range of 0 nm to 40 nm.

3. The liquid crystal display according to claim 1, wherein the first optically anisotropic layer comprises a discotic compound.

4. The liquid crystal display according to claim 1, wherein the degree of a pretilt angle of the liquid crystal cell is 20° or more.

5. The liquid crystal display according to claim 1, wherein the second optically anisotropic layer is a cellulose ester film.

6. The liquid crystal display according to claim 1, wherein a voltage applied to the liquid crystal cell in black displaying state is 5V or less.

* * * * *